United States Patent
Yamashita

(10) Patent No.: US 8,238,332 B2
(45) Date of Patent: Aug. 7, 2012

(54) SIGNAL TRANSMITTING AND RECEIVING DEVICES, SYSTEMS, AND METHOD FOR MULTIPLEXING PARALLEL DATA IN A HORIZONTAL AUXILIARY DATA SPACE

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 12/435,058

(22) Filed: May 4, 2009

(65) Prior Publication Data
US 2009/0303385 A1  Dec. 10, 2009

(30) Foreign Application Priority Data

Jun. 5, 2008  (JP) .................................. 2008-148567

(51) Int. Cl.
*H04L 12/50* (2006.01)
*H04Q 11/00* (2006.01)

(52) U.S. Cl. .................. 370/366; 370/395.62; 370/503; 370/509; 370/514

(58) Field of Classification Search ........................ None
See application file for complete search history.

(56) References Cited

U.S. PATENT DOCUMENTS

| | | | | |
|---|---|---|---|---|
| 4,542,406 A * | 9/1985 | Shimoyama et al. | ......... | 348/472 |
| 5,199,030 A * | 3/1993 | Ueda | .............. | 386/201 |
| 5,485,199 A * | 1/1996 | Elkind et al. | .................. | 348/180 |
| 5,523,795 A * | 6/1996 | Ueda | .............. | 348/480 |
| 5,877,815 A * | 3/1999 | Tsujimura | ..................... | 348/515 |
| 6,690,428 B1 * | 2/2004 | Hudelson et al. | ............. | 348/461 |
| 7,567,588 B2 * | 7/2009 | Satoh et al. | .................... | 370/474 |
| 7,792,152 B1 * | 9/2010 | Xu et al. | ........................ | 370/503 |
| 2002/0097869 A1 * | 7/2002 | Pasqualino et al. | ........... | 380/200 |
| 2003/0215017 A1 * | 11/2003 | Fang | ........................ | 375/240.25 |
| 2005/0156869 A1 * | 7/2005 | Mori et al. | ..................... | 345/104 |
| 2005/0177662 A1 * | 8/2005 | Hauke et al. | .................. | 710/104 |

(Continued)

FOREIGN PATENT DOCUMENTS

JP  2002-34005  1/2002

(Continued)

OTHER PUBLICATIONS

Somers, Steve, HD-SDI, HDMI, and Tempus Fugit, Summer 2007, ExtroNews, 18.2, pp. 18-21.*

(Continued)

*Primary Examiner* — Ayaz Sheikh
*Assistant Examiner* — Peter Chau
(74) *Attorney, Agent, or Firm* — Oblon, Spivak, McClelland, Maier & Neustadt, L.L.P.

(57) ABSTRACT

A signal transmitting device includes: a synchronous-data detecting unit that detects, from parallel data specified by a predetermined format and including video data and audio data, synchronous data for controlling synchronization of the parallel data; an audio extracting unit that stores the audio data in an audio memory; a clock extracting unit that extracts a reference clock from the parallel data; a multiplexing unit that multiplexes the audio data and the synchronous data in a horizontal auxiliary data space of the video data; a control unit that controls, on the basis of the synchronous data and the reference clock, timing of the multiplexing unit for multiplexing the audio data with the video data; and a parallel serial converting unit that converts the video data multiplexed with the audio data by the multiplexing unit into a transmission stream specified by a Level A of a 3G-SDI format.

10 Claims, 12 Drawing Sheets

U.S. PATENT DOCUMENTS

| | | | |
|---|---|---|---|
| 2005/0206740 A1* | 9/2005 | Tanabe | 348/211.1 |
| 2005/0281296 A1* | 12/2005 | Yamashita | 370/537 |
| 2006/0053441 A1* | 3/2006 | Walker | 725/30 |
| 2006/0210254 A1* | 9/2006 | Yamashita et al. | 386/117 |
| 2007/0011720 A1* | 1/2007 | Min | 725/151 |
| 2007/0268404 A1* | 11/2007 | Maertens et al. | 348/515 |
| 2008/0031450 A1* | 2/2008 | Yamashita | 380/212 |
| 2008/0066097 A1* | 3/2008 | Park et al. | 725/32 |
| 2009/0303381 A1* | 12/2009 | Setya et al. | 348/441 |

FOREIGN PATENT DOCUMENTS

| | | |
|---|---|---|
| JP | 2002-300129 | 10/2002 |
| JP | 2004-23134 | 1/2004 |
| JP | 2004-88272 | 3/2004 |
| JP | 2004-120799 | 4/2004 |
| JP | 2005-328494 | 11/2005 |
| JP | 2006-13830 | 1/2006 |
| JP | 2007-306539 | 11/2007 |
| JP | 2008-28554 | 2/2008 |

OTHER PUBLICATIONS

Harding et al., "Convergence of Standard Definition (SD) and High Definition (HD) SDI for Audio Multiplexing and De-multiplexing by Implementing Modular Design", 2004, IEEE.*

Manabu Kuromori, "Serial digital interface design technique for high-vision, from the selection of FPGA-related parts to the basic knowledge of a video signal", Design Wave Magazine, vol. 13, No. 1, CQ publication Co., Ltd., Jan. 1, 2008, pp. 103-114.

Office Action issued May 12, 2010, in Japanese Patent Application No. 2008-148567 (with English-language translation).

* cited by examiner

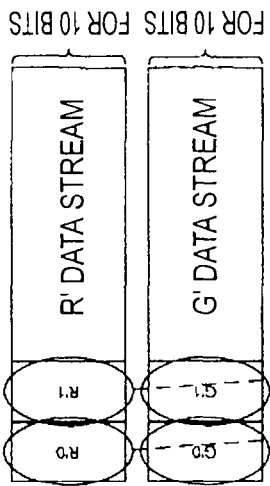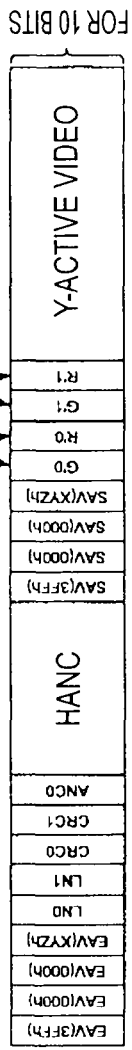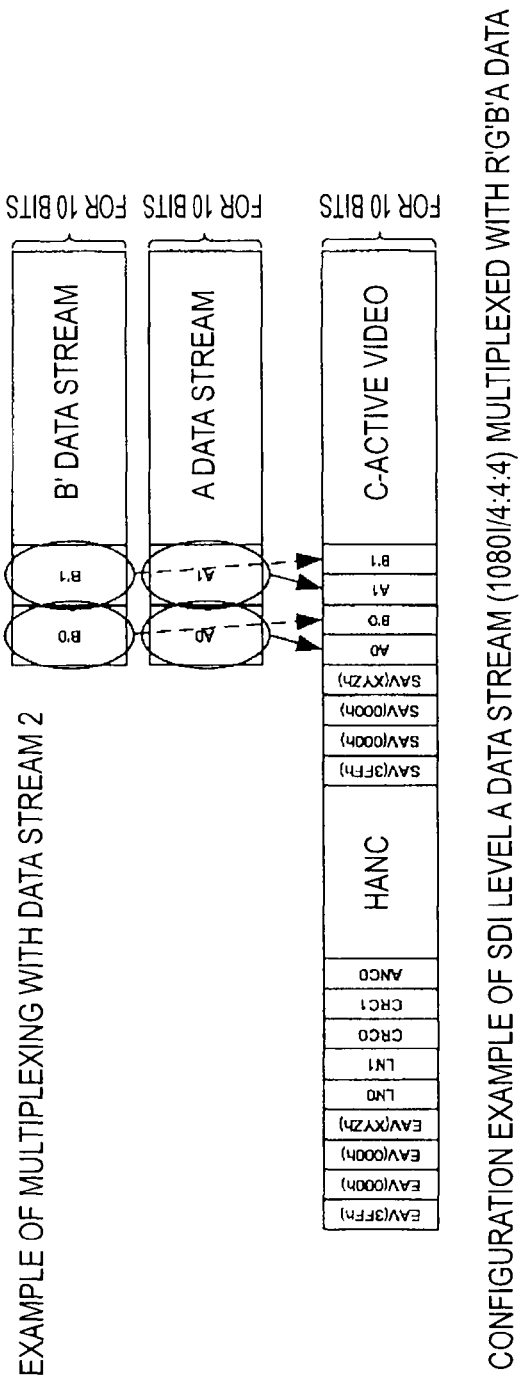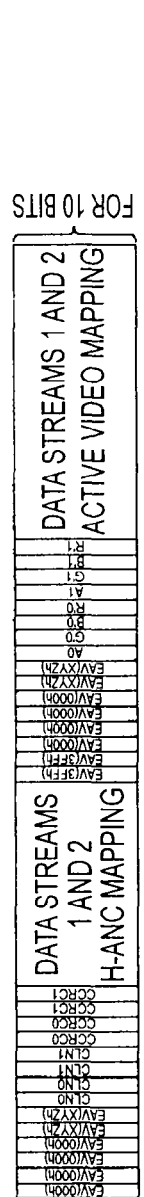
FIG. 6A  EXAMPLE OF MULTIPLEXING WITH DATA STREAM 1
FIG. 6B  EXAMPLE OF MULTIPLEXING WITH DATA STREAM 2
FIG. 6C  CONFIGURATION EXAMPLE OF SDI LEVEL A DATA STREAM (1080I/4:4:4) MULTIPLEXED WITH R'G'B'A DATA

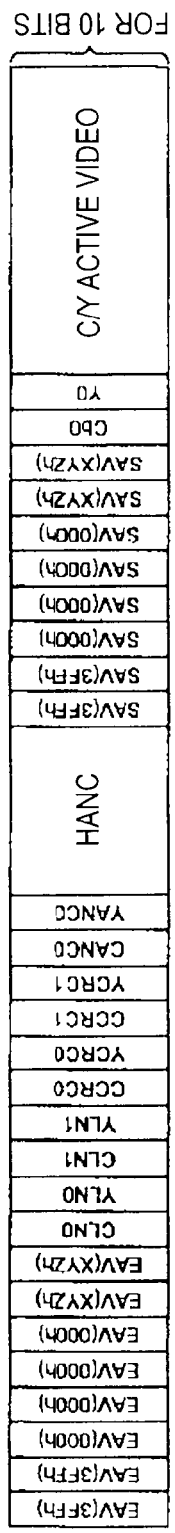
FIG. 7A CONFIGURATION EXAMPLE OF LINK A
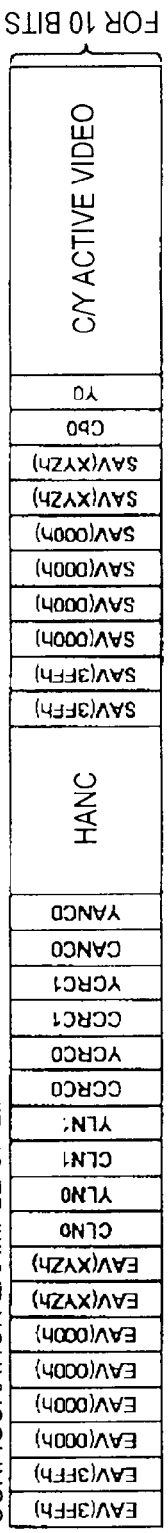
FIG. 7B CONFIGURATION EXAMPLE OF LINK B
FIG. 7C CONFIGURATION EXAMPLE OF 3G-SDI LEVEL B DATA STREAM
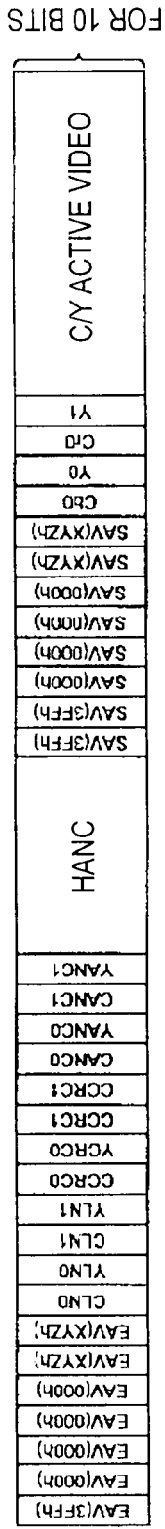
FIG. 8

FIG.9

| | Frame rate | | 96 kHz | 48 kHz | 44.1 kHz | 32 kHz |
|---|---|---|---|---|---|---|
| 1920×1080 | 60P | No | 2 | 1 | 1 | 1 |
| | | DETERMINATION | 2×1124 > 1600 | 1124 > 800 | 1124 > 735 | 1124 > 533.333 |
| | | Na | 2 | 1 | 1 | 1 |
| | 60/1.001P | No | 2 | 1 | 1 | 1 |
| | | DETERMINATION | 2×1124 > 1601.6 | 1124 > 800.8 | 1124 > 735.735 | 1124 > 533.866 |
| | | Na | 2 | 1 | 1 | 1 |
| | 50P | No | 2 | 1 | 1 | 1 |
| | | DETERMINATION | 2×1124 > 1920 | 1124 > 960 | 1124 > 882 | 1124 > 640 |
| | | Na | 2 | 1 | 1 | 1 |
| | 30P | No | 3 | 2 | 2 | 1 |
| | | DETERMINATION | 3×1123 > 3200 | 2×1123 > 1600 | 2×1123 > 1470 | 1×1123 > 1066.66 |
| | | Na | 3⇒4 | 2 | 2 | 1 |
| | 30/1.001P | No | 3 | 2 | 2 | 1 |
| | | DETERMINATION | 3×1123 > 3203.2 | 2×1123 > 1600 | 2×1123 > 1471.47 | 1×1123 > 1067.73 |
| | | Na | 3⇒4 | 2 | 2 | 1 |
| | 25P | No | 4 | 2 | 2 | 2 |
| | | DETERMINATION | 4×1123 > 3840 | 2×1123 > 1920 | 2×1123 > 1764 | 2×1123 > 1280 |
| | | Na | 4 | 2 | 2 | 2 |
| | 24P | No | 4 | 2 | 2 | 2 |
| | | DETERMINATION | 4×1123 > 4000 | 2×1123 > 2000 | 2×1123 > 1837.5 | 2×1123 > 1333.33 |
| | | Na | 4 | 2 | 2 | 2 |
| | 24/1.001P | No | 4 | 2 | 2 | 2 |
| | | DETERMINATION | 4×1123 > 4004 | 2×1123 > 2002 | 2×1123 > 1839.33 | 2×1123 > 1334.66 |
| | | Na | 4 | 2 | 2 | 2 |
| 720P | 60P | No | 3 | 2 | 1 | 1 |
| | | DETERMINATION | 3×749 > 1600 | 2×749 > 800 | 1×749 > 735 | 1×749 > 533.33 |
| | | Na | 3⇒4 | 2 | 1 | 1 |
| | 60/1.001P | No | 3 | 2 | 1 | 1 |
| | | DETERMINATION | 3×749 > 1601.6 | 2×749 > 800.8 | 1×749 > 735.735 | 1×749 > 533.866 |
| | | Na | 3⇒4 | 2 | 1 | 1 |
| | 50P | No | 3 | 2 | 2 | 1 |
| | | DETERMINATION | 3×749 > 1920 | 2×749 > 960 | 2×749 > 882 | 1×749 > 640 |
| | | Na | 3⇒4 | 2 | 2 | 1 |
| | 30P | No | 5 | 3 | 2 | 2 |
| | | DETERMINATION | 5×749 > 3200 | 3×749 > 1600 | 2×749 > 1470 | 2×749 > 1066.66 |
| | | Na | 5⇒6 | 3 | 2 | 2 |
| | 30/1.001P | No | 5 | 3 | 2 | 2 |
| | | DETERMINATION | 5×749 > 3203.2 | 3×749 > 1601.6 | 2×749 > 1471.47 | 2×749 > 1067.73 |
| | | Na | 5⇒6 | 3 | 2 | 2 |
| | 25P | No | 6 | 3 | 3 | 2 |
| | | DETERMINATION | 6×749 > 3840 | 3×749 > 1920 | 3×749 > 1764 | 2×749 > 1280 |
| | | Na | 6 | 3 | 3 | 2 |
| | 24P | No | 6 | 3 | 3 | 2 |
| | | DETERMINATION | 6×749 > 4000 | 3×749 > 2000 | 3×749 > 1837.5 | 2×749 > 1333.33 |
| | | Na | 6 | 3 | 3 | 2 |
| | 24/1.001P | No | 6 | 3 | 3 | 2 |
| | | DETERMINATION | 6×749 > 4004 | 3×749 > 2002 | 3×749 > 1765.764 | 2×749 > 1334.66 |
| | | Na | 6 | 3 | 3 | 2 |

EXAMPLE OF FIRST AUDIO DATA PACKET

EXAMPLE OF SECOND AUDIO DATA PACKET

FIG.14

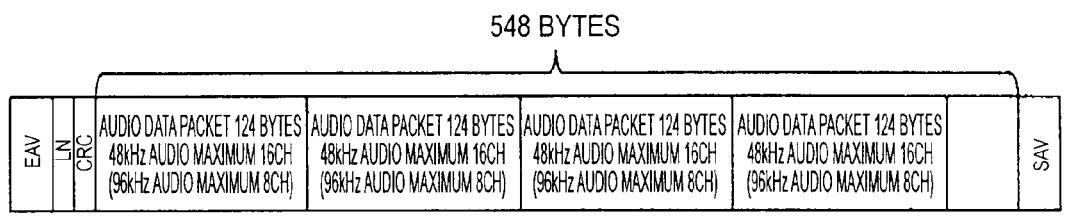

FIG.15

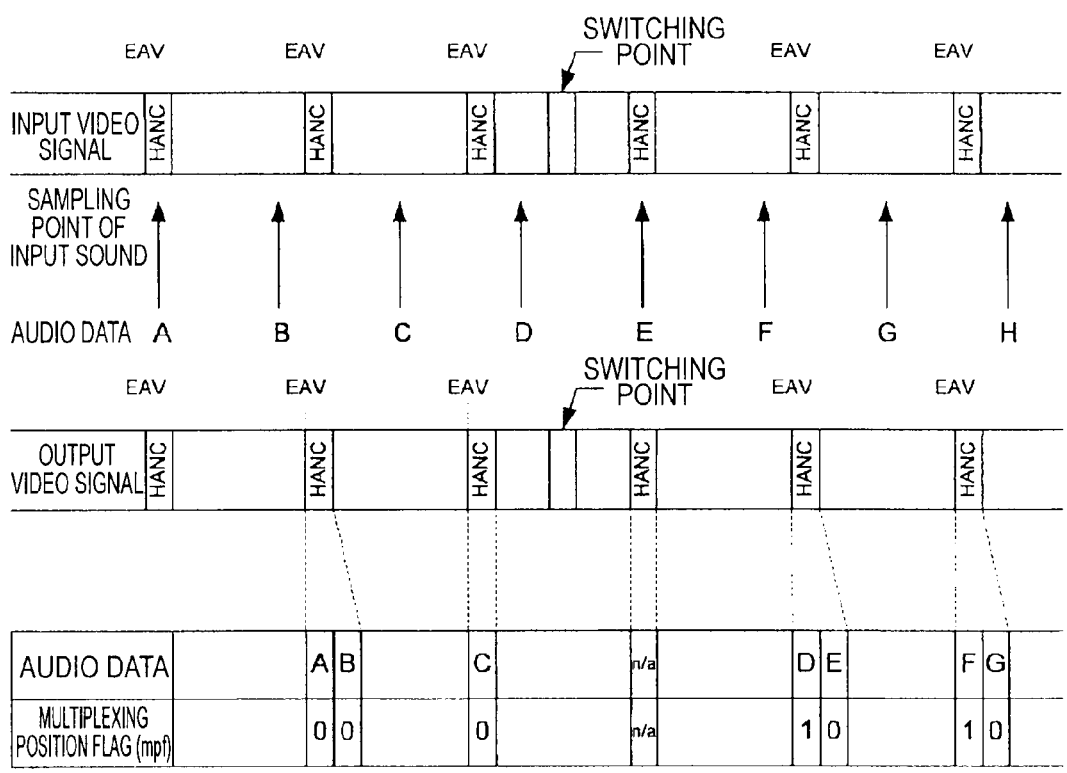

NOTE:
1. For example, in the case of samples A, B, C, E, and G, an auxiliary data packet is multiplexed with horizontal auxiliary data space of the next line with respect to input timing of an audio data sample. Therefore, mpf is set to 0.

2. N/A (Not Available) indicates that multiplexing of an auxiliary data packet is prohibited in the next line of a switching point.

3. In an example of samples D and F, an auxiliary data packet is multiplexed with horizontal auxiliary data space of a second line with respect to input timing of an audio sample. Therefore, mpf is set to 1.

FIG.16

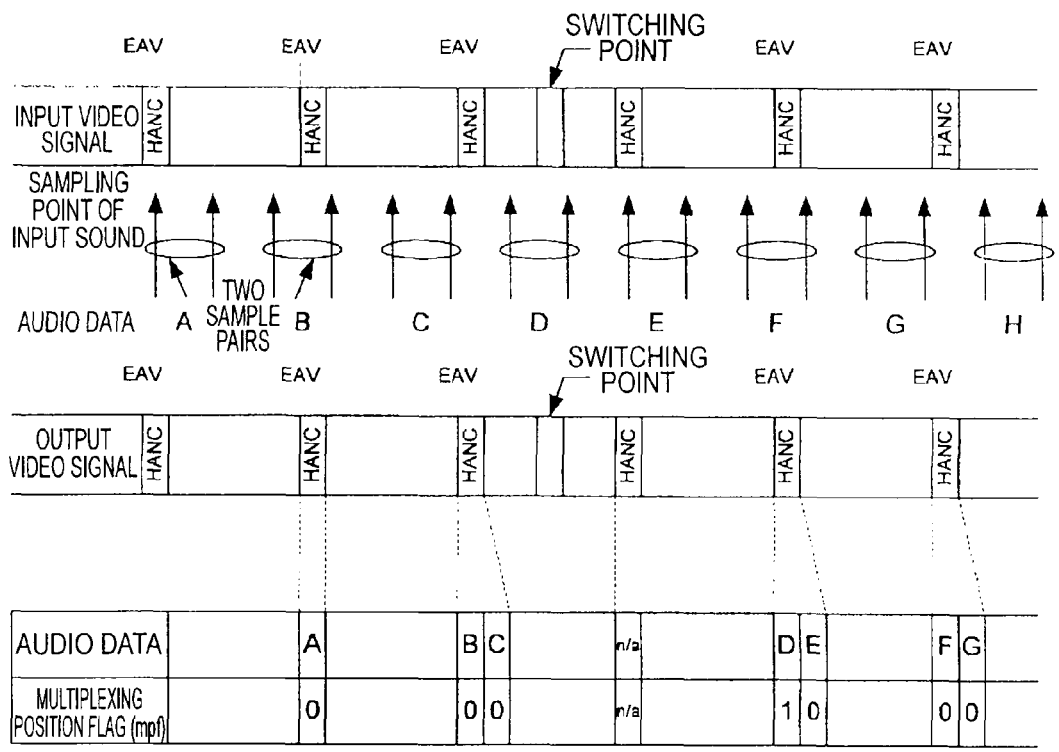

NOTE:
1. For example, in the case of samples A, B, C, E, F, and G, an auxiliary data packet is multiplexed with horizontal auxiliary data space of the next line with respect to input timing of an audio data sample. Therefore, mpf is set to 0.

2. N/A (Not Available) indicates that multiplexing of an auxiliary data packet is prohibited in the next line of a switching point.

3. In an example of sample D, an auxiliary data packet is multiplexed with horizontal auxiliary data space of a second line with respect to input timing of an audio sample. Therefore, mpf is set to 1.

SIGNAL TRANSMITTING AND RECEIVING DEVICES, SYSTEMS, AND METHOD FOR MULTIPLEXING PARALLEL DATA IN A HORIZONTAL AUXILIARY DATA SPACE

BACKGROUND OF THE INVENTION

1. Field of the Invention

The present invention relates to a signal transmitting device, a signal transmitting method, a signal receiving device, and a signal receiving method for serially transmitting a video signal specified by a 3G-SDI format and a sound signal that synchronizes with the video signal.

2. Description of the Related Art

The development of an image receiving system and an imaging system for an ultra high definition video signal exceeding the present HD (High Definition) signal, which is a video signal (an image signal) having a one-frame size of 1920 samples×1080 lines, is under way. For example, a UHDTV (Ultra High Definition Television) standard, which is a broadcast system of the next generation having the number of pixels four times to sixteen times as larger as the present HD, is proposed in the ITU (International Telecommunication Union) and the SMPTE (Society of Motion Picture and Television Engineers) and standardized. Video signals of a video standard proposed in the ITU and the SMPTE are video signals of 3840 samples×2160 lines and 7680 samples×4320 lines twice and four times as large as 1920 samples×1080 lines.

In recent years, a standard for transmitting a signal of 1920 samples×1080 lines/60 P, which is a frame rate twice as high as 1920 samples×1080 lines/30 P (60I), and a high-resolution video such as a digital cinema using a 3G-SDI called SDI (Serial Digital Interface) of the third generation is proposed in SMPTE425M. The 3G-SDI Level A specifies 1080I/P transmitted by an HD-SDI. The 3G-SDI Level B is specified as a system for multiplexing two HD-SDIs. This is because a transmission rate in the 3G-SDI is twice as high as that in the HD-SDI. The number of multiplexes of audio data sampled at 48 kHz (audio data sampled at n kHz is hereinafter abbreviated as "n kHz sampling audio") is maximum 16 channels per one channel of the HD-SDI.

JP-A-2005-328494 discloses a technique for serially transmitting a 3840×2160/30 P, 30/1.001 P/4:4:4:/12 bit signal, which is a kind of a 4 k×2 k signal (an ultrahigh resolution signal of 4 k samples×2 k lines), at a bit rate equal to or higher than 10 Gbps. [3840×2160/30 P] indicates [the number of pixels in the horizontal direction]×[the number of lines in the vertical direction]/[the number of frames per one second]. The same applies in the following explanation of this specification. [4:4:4] indicates a ratio of [red signal R: green signal G: blue signal B] in the case of a primary color signal transmission system and indicates a ratio of [luminance signal Y: first color difference signal Cb: second color difference signal Cr] in the case of a color difference signal transmission system.

SUMMARY OF THE INVENTION

SMPTE425M as the current 3G-SDI standard specifies that audio multiplexing in the 3G-SDI Level A conforms to SMPTE299M. Therefore, 48 kHz sampling audio can only be multiplexed to 16 channels at the maximum. Similarly, 96 kHz sampling audio can only be multiplexed to 8 channels at the maximum. Therefore, it is difficult to multiplex multi-channel audio exceeding 16 channels with video data.

On the other hand, the dual link 292 standard and the 3G-SDI Level B specify that, when each of Links A and B is 48 kHz sampling audio, the 48 kHz sampling audio can be multiplexed to 16 channels at the maximum. In the case of 96 kHz sampling audio, since the 96 kHz sampling audio can be multiplexed to 8 channels at the maximum, when the Links A and B are totaled, 48 kHz sampling audio can be multiplexed to 32 channels at the maximum. Similarly, 96 kHz sampling audio can be multiplexed to 16 channels at the maximum.

Therefore, in the case of audio in the 3G-SDI Level A, a maximum number of channel to which n kHz sampling audio can be multiplexed (hereinafter also simply referred to as "maximum number of multiplexes") is half that of the dual link 292 and the 3G-SDI Level B. As a result, when audio exceeding 48 kHz sampling audio 16 ch is multiplexed to the 3G-SDI Level B, the audio is not compatible with the audio in the 3G-SDI Level A.

Thus, it is desirable to increase a maximum number of multiplexes of audio data multiplexed to a transmission stream specified by the Level A of the 3G-SDI format.

In an embodiment of the present invention, from parallel data specified by a predetermined format and including video data and audio data, synchronous data for controlling synchronization of the parallel data is detected. The audio data is stored in an audio memory. A reference clock is extracted from the parallel data.

Timing for multiplexing the audio data with the video data is controlled on the basis of the synchronous data and the reference clock. The audio data read out from the audio memory and the synchronous data are multiplexed in a horizontal auxiliary data space of the video data.

The video data multiplexed with the audio data is converted into a transmission stream specified by the Level A of the 3G-SDI format.

A transmission stream specified by the Level A of the 3G-SDI format and including video data and audio data included in a horizontal auxiliary data space of the video data is converted into parallel data.

Synchronous data for controlling synchronization of the parallel data included in the parallel data is detected. The audio data extracted from the parallel data is stored in an audio memory.

A reference clock is extracted from the parallel data. Timing for multiplexing the audio data with the video data is controlled on the basis of the synchronous data and the reference clock to multiplex the audio data read out from the audio memory with the video data.

Consequently, it is possible to increase a maximum number of multiplexes of the audio data multiplexed with the transmission stream specified by the Level A of the 3G-SDI format.

According to the embodiment of the present invention, it is possible to increase a maximum number of multiplexes of the audio data multiplexed with the transmission stream specified by the 3G-SDI Level A. Therefore, it is possible to multiplex multi-channel audio data with the transmission stream. Further, there is an effect that compatibility of audio multiplexing with the dual link 292 and the 3G-SDI Level B can be given to the 3G-SDI Level A.

BRIEF DESCRIPTION OF THE DRAWINGS

FIGS. 6A to 6C are diagrams for explaining examples of multiplexing of R', G', B', and A data with data streams 1 and 2 according to the first embodiment;

FIGS. 7A to 7C are diagrams for explaining configuration examples of Links A and B and a data stream in the 3G-SDI Level B according to the first embodiment;

FIG. 8 is a diagram for explaining a configuration example of a data stream in the 3G-SDI Level B according to the first embodiment;

FIG. 9 is a diagram for explaining a calculation example of Na according to the first embodiment;

FIG. 14 is a diagram for explaining a configuration example of an audio data packet according to the first embodiment;

FIG. 15 is a diagram of an example of a relation between a multiplexing position flag and a multiplexing position of a 48kHz audio data packet according to the first embodiment;

FIG. 16 is a diagram of an example of a relation between a multiplexing position flag and a multiplexing position of a 96 kHz audio data packet according to the first embodiment;

DESCRIPTION OF THE PREFERRED EMBODIMENTS

A first embodiment of the present invention is explained below with reference to FIGS. 1 to 16. In an example explained in this embodiment, the present invention is applied to a signal transmitting device 10 and a CCU 2 that can transmit serial digital data obtained by multiplexing audio data with video data using a 3G-SDI.

Figure 1:
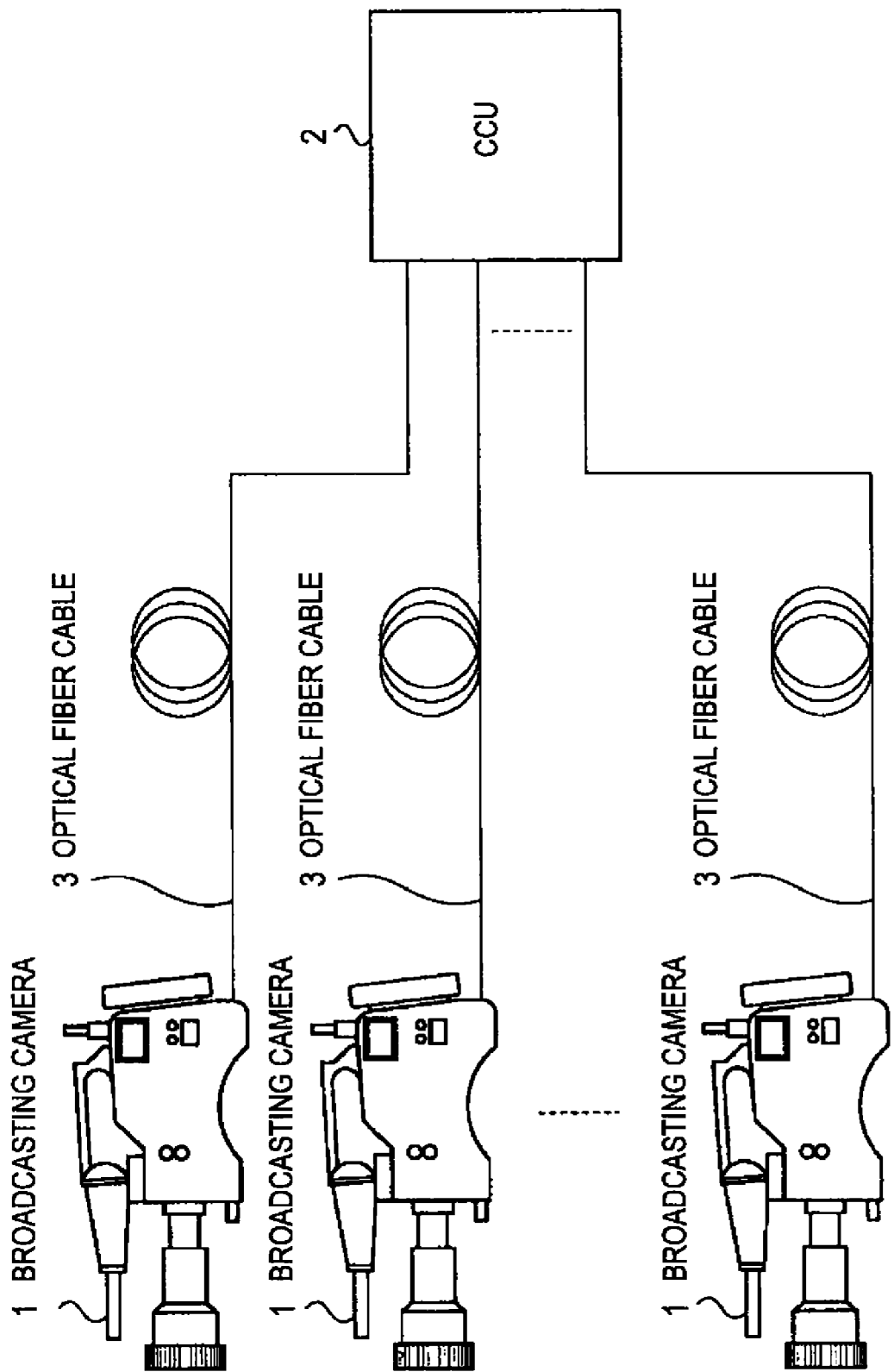
FIG. 1 is a diagram of an example of a transmission system according to a first embodiment of the present invention.

FIG. 1 is a diagram of an overall configuration of a camera transmission system for a television broadcasting station according to this embodiment. The camera transmission system includes plural broadcasting cameras 1 and a CCU (camera control unit) 2. The broadcasting cameras 1 are connected to the CCU 2 by optical fiber cables 3.

The broadcasting cameras 1 have the same configuration and generate an m-bit quantized signal (m is 10 or 12) for broadcast as a 1080 P signal or a 1080I/4:4:4 signal. The broadcasting cameras 1 include signal transmitting devices 10 that transmit a signal in a level A of a 3G-SDI format. When the m-bit quantized signal adopted by the broadcasting cameras 1 is any one of a 10-bit quantized signal with video data of 4:4:4(R'G'B')/(Y'C'bC'r), a 10-bit quantized signal with video data of 4:4:4:4(R'G'B'+A)/(Y'C'bC'r+A), and 12-bit quantized signal with video data of 4:4:4(R'G'B')/(Y'C'bC'r)/X'Y'Z' and frame rates are 24 P, 24/1.001 P (24/1.001 P is included in 24 P after this), 25 P, 30 P, and30/1.001 P (30/1.001 P is included in30 P after this) or when the m-bit quantized signal is a 12-bit quantized signal with video data of 4:2:2/(Y'C'bC'r) and frame rates are 24 P, 24/1.001 P, 25 P, 30 P, and 30/1.001 P, a horizontal auxiliary data space in the quantized signal has length at least twice as large as a horizontal auxiliary data space included in the HD-SDI.

When the m-bit quantized signal is a 10-bit quantized signal with video data of 4:2:2/(Y'C'bC'r) or a 10-bit quantized signal with frame rates of 50 P, 60 P, and 60/1.001 P, the number of lines per unit time is at least twice as large as the number of lines per unit time of the HD-SDI. The broadcasting cameras 1 generate a 1080/60 P/4:2:2:/10 bit or 1080/30 P/4:4:4/bit signal in which the video data is included and transmits the signal to the CCU 2.

A ch is also referred to as an α channel and is used in multiplexing a key signal and the like. X'Y'Z' is a signal obtained by converting a video signal represented by a color space XYZ defined in a digital cinema using a digital conversion formula (tristimulus values of XYZ in a CIEXYZ calorimetric system and reference luminance L in the following formulas (1) to (3)).

$$CV_{X'} = \text{INT}\left[4095 * \left(\frac{L*X}{52.37}\right)^{1/2.6}\right] \quad (1)$$

$$CV_{Y'} = \text{INT}\left[4095 * \left(\frac{L*Y}{52.37}\right)^{1/2.6}\right] \quad (2)$$

$$CV_{Z'} = \text{INT}\left[4095 * \left(\frac{L*Z}{52.37}\right)^{1/2.6}\right] \quad (3)$$

The CCU 2 is a unit that controls the broadcasting cameras 1, receives video signals from the broadcasting cameras 1, and transmits a video signal (a return video) for causing a monitor of the broadcasting camera 1 to display a video being photographed by the other broadcasting cameras 1. The CCU 2 functions as a signal receiving device that receives video signals from the broadcasting cameras 1.

Figure 2:
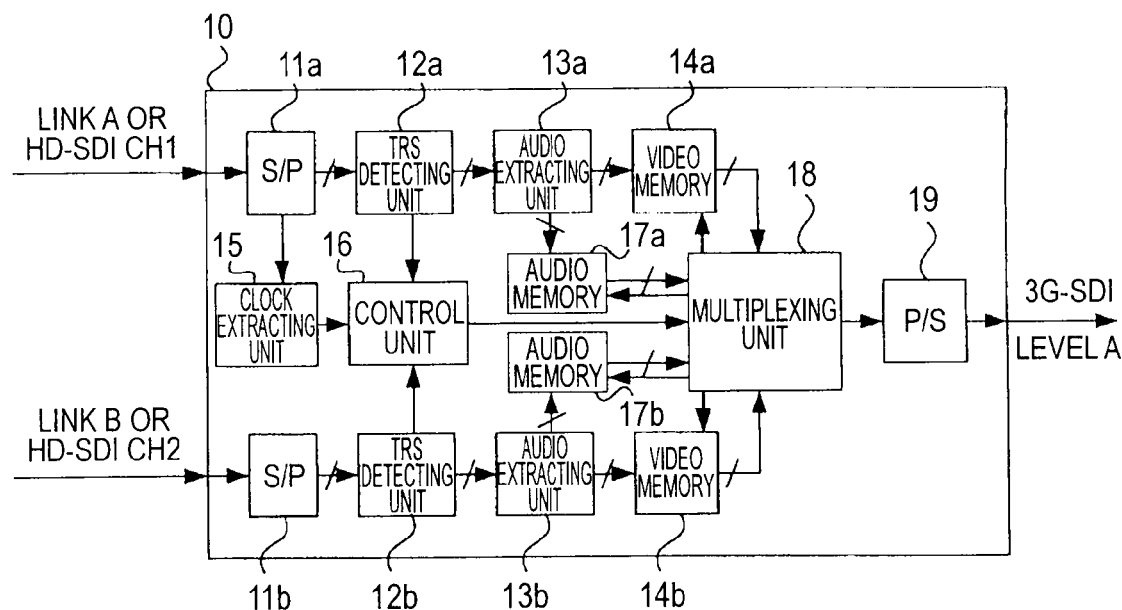
FIG. 2 is a block diagram of an internal configuration example of a signal transmitting device according to the first embodiment.

FIG. 2 is a block diagram of a signal transmitting device 10 according to this embodiment in a circuit configuration of the broadcasting camera 1. 1080/60 P/4:2:2/10 bits or 1080/30 P/4:4:4/bits generated by an imaging unit and a video-signal processing unit (not shown) in the broadcasting camera 1 are sent to the signal transmitting device 10.

In an example of blocks and processing shown in FIG. 2, parallel signals of a dual link (Links A and B) or a 2ch HD-SDI format or parallel signals of the dual link or an HD-SDI format are input to the signal transmitting device 10. When the parallel signals of the dual link (the Links A and B) or the 2ch HD-SDI format are input to the signal transmitting device 10, instead of S/P converting units 11a and 11b, a circuit that logically determines High or Low of parallel data with a flip-flop and captures the parallel data at timing of a rising edge of parallel clocks is used.

The signal transmitting device 10 includes serial parallel (S/P) converting units 11a and 11b that convert received serial data into parallel data and TRS detecting units 12a and 12b that detect a TRS (time reference signal) included in the received data. The serial data received by the signal transmitting device 10 is specified by a predetermined format and includes video data and audio data. The TRS is synchronous data for controlling synchronization of the parallel data.

The signal transmitting device 10 further includes audio extracting units 13a and 13b that extract the audio data included in the parallel data and video memories 14a and 14b that temporarily store parallel data in plural lines. The signal transmitting device 10 further includes a clock extracting unit 15 that extracts a reference clock of a predetermined frequency from the S/P converting unit 11a and a control unit 16 that controls, on the basis of the TRS detected by the TRS detecting units 12a an 12b and the reference clock supplied from the clock extracting unit 15, timing for multiplexing the audio data and the synchronous data. The signal transmitting device 10 further includes a memory that stores the audio data extracted by the audio extracting units 13a and 13b in audio memories 17a and 17b and stores the video data from which the audio data is extracted in the video memories 14a and 14b.

The signal transmitting device 10 further includes a multiplexing unit 18 that multiplexes, at the timing controlled by the control unit 16, the audio data read out from the audio memories 17a and 17b with the parallel data read out from the video memories 14a and 14b. The multiplexing unit 18 multiplexes the audio data and the synchronous data in a horizontal auxiliary data space of the video data read out from the video memories 14a and 14b. The signal transmitting device 10 further includes a parallel serial (P/S) converting unit 19 that converts the parallel data multiplexed with the audio data by the multiplexing unit 18 into serial data.

The signal transmitting device 10 aligns phases of input signals in the memory with reference to a TRS (timing reference signal) of a first channel of the Link A and then reads out the signals. The signal transmitting device 10 multiplexes the Links A and B and attaches a TRS thereto. The signal transmitting device 10 multiplexes the audio data with the video data, converts the audio data into serial data (also referred to as transmission stream) of 2.97 Gbps specified in the Level A of the 3G-SDI format in the S/P converting unit 19, and sends the serial data to the CCU 2.

An operation example of the signal transmitting device 10 is explained.

In the signal transmitting device 10, when input signals are a dual link HD-SDI or 2ch HD-SDI, the S/P converting units 11a and 11b S/P-convert channels of the input signals. The TRS detecting units 12a and 12b detect TRSs (SAV/EAV) and synchronize words. The word synchronization is processing for adjusting delimiters of words. The audio extracting units 13a and 13b extract audio data and send the audio data to the audio memories 17a and 17b. The audio extracting units 13a and 13b input video data after the extraction of the audio data to the video memories 14a and 14b.

The clock extracting unit 15 reproduces a clock from a first channel of the input channels. The control unit 16 creates, using the word synchronous signal TRS, a reference signal, parallel clocks of 74.25 MHz and 145.5 MHz, a serial clock of 2.97 GHz, and the like necessary for the signal transmitting device 10 and distributes the same to the functional blocks.

Figure 3:
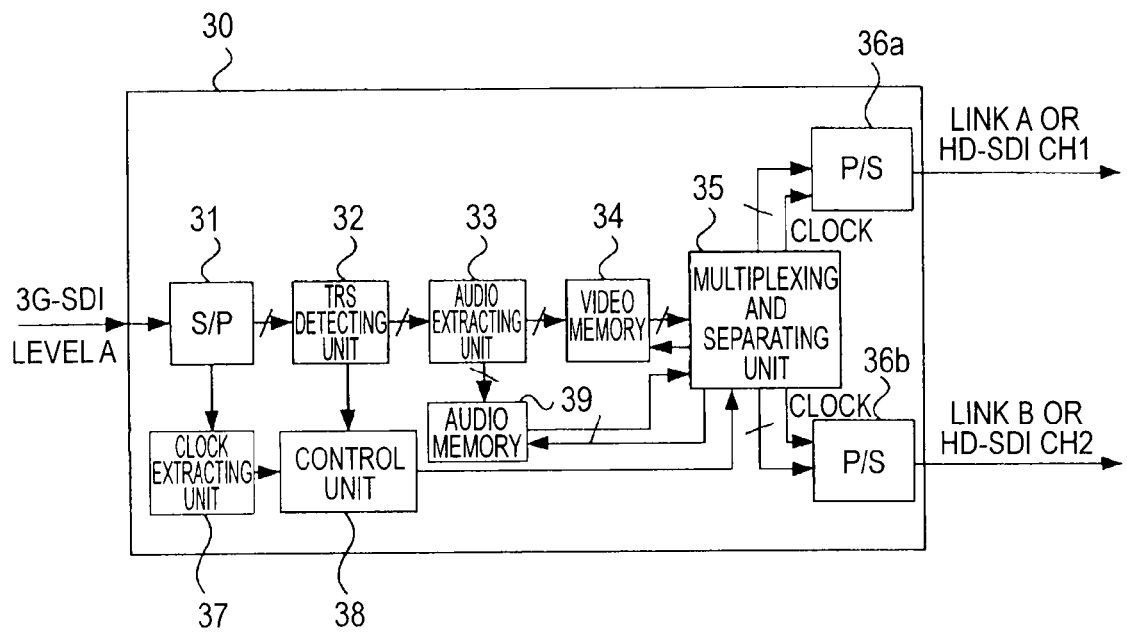
FIG. 3 is a block diagram of an internal configuration example of a signal receiving device according to the first embodiment.

The multiplexing unit 18 reads out, from the video memories 14a and 14b, video signals and the like with channel phases thereof aligned with reference to word synchronous signals such as a TRS of the first channel of the dual link HD-SDI and the 2ch HD-SDI. As indicated by FIG. 3 of SMPTE424M, the multiplexing unit 18 multiplexes the Links A and B, attaches TRSs thereto, and multiples the audio data according to FIGS. 11 to 14 referred to later. The P/S converting unit 19 sends a serial-converted signal to the CCU 2 with a transmission stream of 2.97 Gbps.

FIG. 3 is a block diagram of a signal receiving device 30 according to this embodiment in the circuit configuration of the CCU 2. The signal receiving device 30 outputs a 3G-SDI Level A signal, which is received from the broadcasting camera 1, through the dual link (the Links A and B) or the 2ch HD-SDI.

The signal receiving device 30 includes an S/P converting unit 31 that parallel-converts received serial data (a transmission stream) specified in the Level A of the 3G-SDI format and a TRS detecting unit 32 that detects a synchronous signal TRS from received parallel data. The signal receiving device 30 further includes an audio extracting unit 33 that extracts audio data from the parallel data. The audio extracting unit 33 temporarily stores the extracted audio data in an audio memory 39 and temporarily stores video data from which the audio data is extracted in a video memory 34. The signal receiving device 30 further includes a clock extracting unit 37 that extracts a reference clock and the like from the parallel data converted by the S/P converting unit 31 and a control unit 38 that controls processing of the functional blocks.

The signal receiving device 30 further includes a multiplexing and separating unit 35 that multiplexes the audio data read out from the audio memory 39 with the video data read out from the video memory 34 and separates the video data into parallel signals of the dual link (the Links A and B) or the 2ch HD-SDI format or parallel signals of the dual link or the HD-SDI format. The multiplexing and separating unit 35 is supplied with a reference clock from the control unit 38. Timing of the multiplexing and separating unit 35 for multiplexing the audio data with the video data and separating the video data is controlled. The audio data multiplexed by the multiplexing and separating unit 35 is sent to the audio memory 39 and the video data is sent to the video memory 34.

The parallel data separated and multiplexed by the multiplexing and separating unit 35 is converted into a channel 1 of the dual link Link A or the HD-SDI by a P/S converting unit 36a. Similarly, the parallel data separated and multiplexed by the multiplexing and separating unit 35 is converted into a channel 2 of the dual link Link B or the HD-SDI by a P/S converting unit 36b.

An operation example of the signal receiving device 30 is explained.

When the signal receiving device 30 receives the 3G-SDI Level A, the S/P converting unit 31 S/P-converts the 3G-SDI Level A. The TRS detecting unit 32 synchronizes words with TRSs (SAV/EAV). The audio extracting unit 33 extracts audio data and sends the audio data to the audio memory 39. The audio extracting unit 33 inputs video data after the extraction of the audio data to the video memory 34.

When an output signal from the signal receiving device 30 is the dual link HD-SDI or the 2ch HD-SDI, the multiplexing and separating unit 35 separates the Links A and B from the video memory 34. The multiplexing and separating unit 35 separates the video data into the Links A and B or the 2ch HD-SDI, attaches TRSs thereto again according to SMPTE292, and multiplexes the audio data again according to SMPTE299M. The P/S converting units 36a and 36b P/S-convert and output channels.

The clock extracting unit 37 reproduces a clock from the input 3G-SDI Level A. The control unit 38 creates, using the clock extracted by the clock extracting unit 37 and the word synchronous signal TRS detected by the TRS detecting unit 32, a reference signal, parallel clocks 74.25 MHz and 145.5 MHz, a serial clock 1.485 GHz, and 48 kHz for audio data necessary for the signal receiving device 30 and distributes the same to the functional blocks.

Figure 4A:
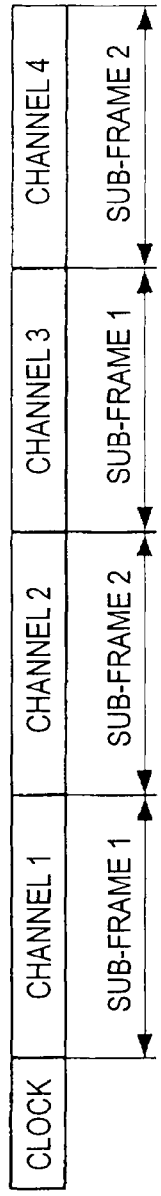
FIGS. 4A and 4B are diagrams for explaining examples of audio data packets according to the first embodiment.
Figure 4B:
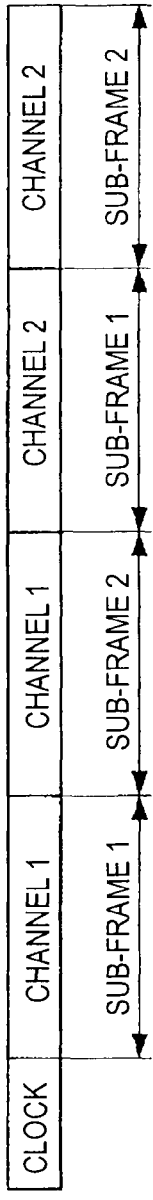

FIGS. 4A and 4B are diagrams of a part of configuration examples of audio data packets in sending audio data sampled at a predetermined sampling frequency with sub-frames 1 and 2. Data structure of the audio data packets is specified by SMPTE299M.

FIG. 4A is a diagram of an example of an audio data packet in sending a 2ch audio signal sampled at a sampling frequency of 48 kHz (hereinafter referred to as 48 kHz audio signal) with the sub-frames 1 and 2. The audio data packet includes a clock area including two user data words (UDWs) and channels 1 to 4 including four UDWs.

FIG. 4B is a diagram of an example of an audio data packet in sending continuous two samples of a 1 ch audio sampled at a sampling frequency of 96 kHz (hereinafter referred to as 96 kHz audio signal) with the sub-frames 1 and 2. The audio data packet includes a clock area including two UDWs and channels 1, 1, 2, and 2 including four UDWs.

As shown in Table 1 below, audio clock phase data is inserted in the clock area. The audio clock phase data is a value indicating timing when audio is generated. The position of an audio sample sampled at a predetermined sampling clock is defined by a sample position at 74.25 MHz in one horizontal period (a horizontal blanking period, an SAV, a video data area, and an EAV) of frames. The audio data packet is multiplexed in a horizontal auxiliary data space by a not-shown formatter.

TABLE 1

Bit allocation of CLK

| Bit Number | UDW 0 | UDW 1 |
|---|---|---|
| B9 (MSB) | Reversal of b8 | Reversal of b8 |
| b8 | Even number parity[1] | Even number parity[1] |
| b7 | ck7 audio clock phase data | 0 |
| b6 | ck6 audio clock phase data | 0 |
| b5 | ck5 audio clock phase data | ck12 audio clock phase data (MSB) |
| b4 | ck4 audio clock phase data | mpf multiplexing position flag |
| b3 | ck3 audio clock phase data | ck11 audio clock phase data |
| b2 | ck2 audio clock phase data | ck10 audio clock phase data |
| b1 | ck1 audio clock phase data | ck9 audio clock phase data |
| b0 (LSB) | ck0 audio clock phase data (LSB) | ck8 audio clock phase data |

[1]Even number parity from b0 to b7

The audio clock phase data is specified by thirteen bits ck0 to ck12. The bits ck0 to ck12 indicate the number of video clocks as a difference between a video sample simultaneously input with a sample of sound input to the formatter and a first word of the EAV of the video stream. In a system that uses a sampling clock of 74.25 MHz by SMPTE292M, ck0 to ck12 can manage an audio clock phase in one horizontal period, in which the audio sample sampled at the predetermined sampling clock is inserted, up to 8192 clocks.

A sub-frame format is specified in FIG. 2 of AES3-2003 as a serial interface standard for digital audio. As a frame format, in the case of 2-channel mode, it is specified that 48 kHz audio of 2 channels is sent by continuous sub-frames 1 and 2. SMPTE299M specifies that 48 kHz audio is inserted in channels 1 and 2.

In the past, as shown in FIG. 4A, a channel 1 is sent with the sub-frame 1 and a channel 2 is sent by the sub-frame 2. A channel 3 is sent by the next sub-frame 1 and a channel is sent by the next sub-frame 2.

In this embodiment, in order to provide compatibility during signal transmission between the signal transmitting device 10 and a device on a reception side, it is specified that a sample in which a channel 1 of 96 kHz audio continues is inserted in the channels 1 and 2 and a sample in which a channel 2 of 96 kHz audio continues is inserted in the channels 3 and 4. In other words, as shown in FIG. 4B, the channel 1 of the sample in which 96 kHz audio of one channel continues is sent by the continuous sub-frames 1 and 2. The channel 2 is sent by the continuous sub-frames 1 and 2.

Configuration examples of data streams in the 3G-SDI Levels A and B are explained with reference to FIGS. 5A to 5C to FIG. 8.

Figure 5A:
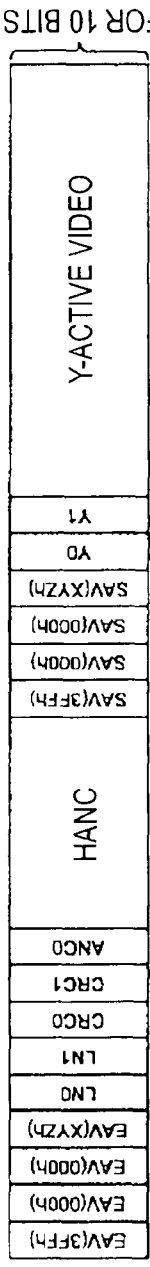
FIGS. 5A to 5C are diagrams for explaining configuration examples of data streams 1 and 2 and a data stream in the 3G-SDI Level A according to the first embodiment.
Figure 5B:
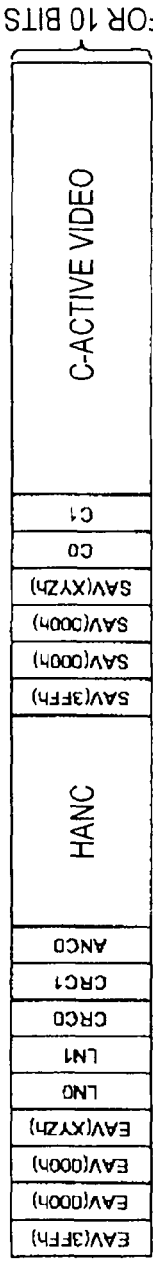
Figure 5C:
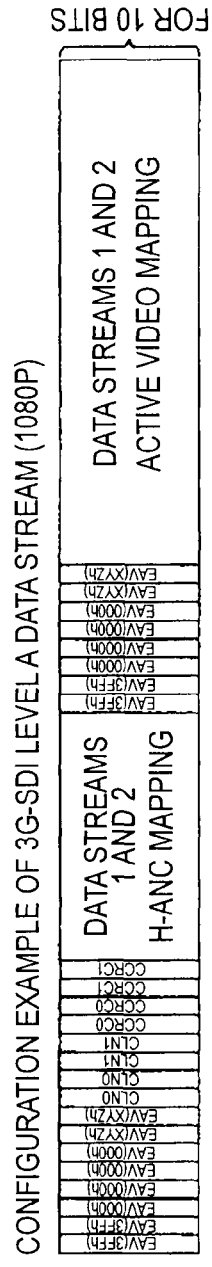

FIGS. 5A to 5C are diagrams of configuration examples of data streams 1 and 2 and a data stream in the 3G-SDI Level A.

FIG. 5A is a diagram of the configuration example of the data stream 1.

The data stream 1 includes a luminance signal (Y) of video data in a Y active video area.

FIG. 5B is a diagram of the configuration example of the data stream 2.

The data stream 2 includes a color difference signal (Cb/Cr) of video data in a C active video area.

FIG. 5C is a diagram of the configuration example of the 3G-SDI Level A data stream in 1080 P.

Cb, Y, Cr, Y, and the like are multiplexed with the 3G-SDI Level A data stream in 10 bit units.

FIGS. 6A to 6C are diagrams of examples of multiplexing of R', G', B', and A data with the data streams 1 and 2.

FIG. 6A is a diagram of an example of multiplexing with the data stream 1.

R'0 and R'1 of an R' data stream and G'0 and G'1 of a G' data stream are stored in C0 and C1 fields of the data stream 2 in order of G'0, R'0, G'1, and R'1.

FIG. 6B is a diagram of an example of multiplexing with the data stream 2.

B'0 and B'1 of a B' data stream and A'0 and A'1 of an A' data stream are stored in Y0 and Y1 fields of the data stream 1 in order of A'0, B'0, A'1, and B'1.

FIG. 6C is a diagram of a configuration example of a 3G-SDI Level A data stream (1080I/4:4:4) multiplexed with R'G'B'A data.

A, G, B, R, and the like are multiplexed with the 3G-SDI Level A data stream in 10 bit units.

FIGS. 7A to 7C are diagrams of configuration examples of the Links A and B and a data stream in the 3G-SDI Level B.

FIG. 7A is a diagram of the configuration example of the Link A.

FIG. 7B is a diagram of the configuration example of the Link B.

FIG. 7C is a diagram of the configuration example of the data stream in the 3G-SDI Level B.

FIG. 8 is a diagram of a configuration example of a data stream in the 3G-SDI Level B multiplexed with the Links A and B.

An audio clock phase is specified according to SMPTE299M. The audio clock phase is defined by a clock phase at a sampling clock 74.25 MHz or 148.5 MHz of a 1080 P signal or 1080I/4:4:4 signal from the EAV in the formatter on the basis of phase information on one horizontal period of the 1080 P signal or the 1080I/4:4:4 signal.

FIG. 9 is a diagram of a calculation example of Na (the number of audio samples per one horizontal line).

A horizontal line of an input video signal includes a timing reference signal indicating a valid line period of the input video signal and an auxiliary data space indicating a horizontal auxiliary data space in the horizontal line. Only a horizontal auxiliary data space of a data stream of a color difference signal (Cr/Cb) is used for sending an audio data packet. However, the horizontal auxiliary data space should not be multiplexed with a horizontal auxiliary space of the next line of a switching point.

The number of multiplexes of an audio data packet allocated to one horizontal auxiliary data space is limited to be equal to or smaller than Na/2 calculated by a conditional expression below. The number of audio samples No per one channel that can be multiplexed in one horizontal auxiliary data space is derived from a value of Na on the basis of the conditional expression.

No=int(number of audio samples per one line)+1    Formula 2

If No×(total number of lines per one video frame−number of switching lines per one video frame)<(number of audio samples per one video frame), Na=No+1

Otherwise,

Na=No

If an audio sample rate is 96 kHz,

Na=Even function (Na)

Note:
1. The number of audio samples per one line=audio sample rate/line frequency
2. The Even function is a function for rounding up a value to a nearest even number value.

A multiplexing position is the next horizontal auxiliary data space of a horizontal auxiliary data space in which an audio sample is generated or a horizontal auxiliary data space immediately following the next horizontal auxiliary data space. In the case of 48 kHz audio of a 24 P signal, Na=2 (4 in 96 kHz audio). Therefore, in the case of 48 kHz audio, when maximum 16 channels (in the case of 96 kHz audio, maximum 8 channels) are transmitted, 124-byte audio data can be sent by two samples.

Figures 10, 11:
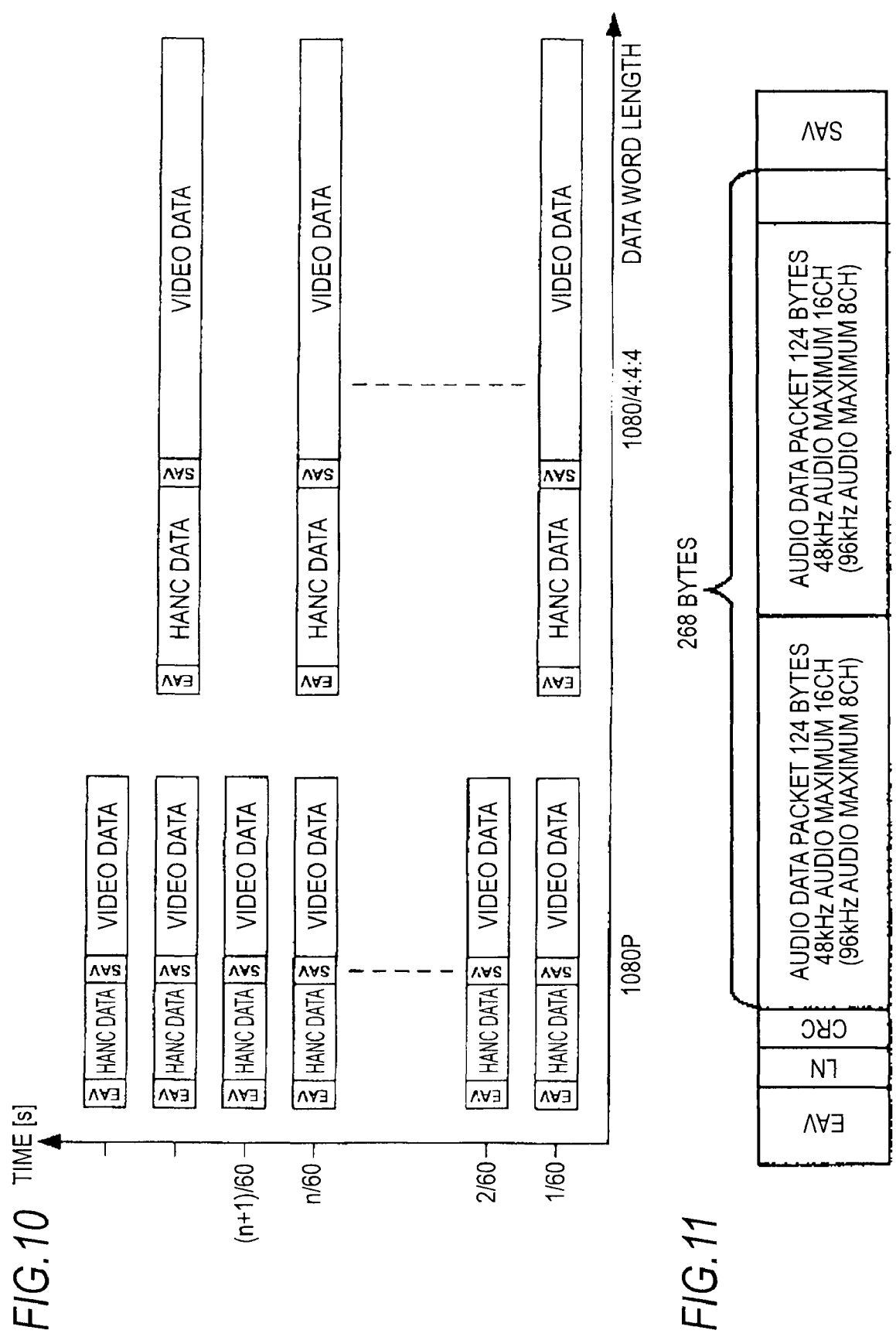
FIG. 10 is a diagram for explaining an example of data structures of 1080 P and 1080I/4:4:4 in the 3G-SDI Level A according to the first embodiment.
FIG. 11 is a diagram for explaining a configuration example of an audio data packet according to the first embodiment.

FIG. 10 is a diagram of an example of data structures of 1080 P and 1080I/4:4:4 in the 3G-SDI Level A.

Table 1 of SMPTE425M is shown in Table 2 below.

TABLE 2

| | | Screen format | | |
|---|---|---|---|---|
| Mapping structure | SMPTE | Screen format | Signal format sampling structure | Frame/field rate |
| 1 | 274M | 1920 × 1080 | 4:2:2($Y'C'_B C'_R$)/10 bits | 60, 60/1.001, 50 frames/second progressive |
| 2 | 296M | 1280 × 720 | 4:4:4(R'G'B'), 4:4:4(R'G'B' + A)/10 bits 4:4:4($Y'C'_B C'_R$), 4:4:4($Y'C'_B C'_R$ + A)/10 bits | 60, 60/1.001, 50 frames/second progressive 30, 30/1.001, 25, 24, 24/1.001 frame/second progressive |
| | 274M | 1920 × 1080 | 4:4:4(R'G'B'), 4:4:4(R'G'B' + A)/10 bits 4:4:4($Y'C'_B C'_R$), 4:4:4($Y'C'_B C'_R$ + A)/10 bits | 60, 60/1.001, 50 fields/second interlace 30, 30/1.001, 25, 24, 24/1.001 frame/second progressive, PsF |
| 3 | 274M | 1920 × 1080 | 4:4:4(R'G'B')/12 bits 4:4:4($Y'C'_B C'_R$)/12 bits | 60, 60/1.001, 50 fields/second interlace 30, 30/1.001, 25, 24, 24/1.001 frame/second progressive, PsF |
| | 428-1 | 2048 × 1080 | 4:4:4(X'Y'Z')/12 bits | 24 frames/second progressive, PsF |
| 4 | 274M | 1920 × 1080 | 4:2:2($Y'C'_B C'_R$)/12 bits | 60, 60/1.001, 50 fields/second interlace 30, 30/1.001, 25, 24, 24/1.001 frame/second progressive, PsF |

As shown in Table 2 (Table 1of SMPTE425M), in this example, an SMPTE standard referred to is SMPTE274M. A mapping structure 1 is explained concerning 1080 P and mapping structures 2 and 3 are explained concerning 1080I.

FIGS. 1 to 4 of SMPTE425M indicate that, when one horizontal period of 1080 P in the 3G-SDI Level A is 60 P, there are 2000 samples. Similarly, FIGS. 2, 3, and 4 of SMPTE425M indicate that, when one horizontal period of 1080I/4:4:4/10 bits, 12 bits, 1080I/4:2:2/12 bits is 60I or 30 P, there are 4400 samples.

This means that, in 1080 P, while the number of samples in one horizontal period is the same as that of the current HD transmitted at 1.5 Gbps, the number of lines per unit time is twice as large as that of the HD. In 1080I, while the number of samples is twice as large as that of the current HD transmitted at 1.5 Gbps, the number of lines per unit time is the same as that of the HD. Therefore, concerning an H blank for multiplexing audio data, in 1080 P, although the number of samples of the H blank is the same as that of the current HD at 1.5 Gbps, the number of lines per unit time is twice as large as that of the HD. On the other hand, in 1080I, although the number of samples of the H blank is twice as large as the current HD at 1.5 Gbps, the number of lines per unit time is the same as that of the HD.

It is specified that an audio data multiplexing system in the 3G-SDI Level A specified in SMPTE425M conforms to SMPTE299M. However, SMPTE299M is "a standard for multiplexing 24-bit audio data defined by AES3 with SMPTE292M (HD-SDI)". Therefore, SMPTE292M is not applicable to the 3G-SDI. When SMPTE292M is used for multiplexing multi-channel audio data in future, SMPTE292M is not compatible with the current dual link standard SMPTE372M in the number of multi-channels.

Therefore, for use in the 3G-SDI Level A, the inventor proposes a new audio data multiplexing system that is compatible with the current audio data multiplexing standard SMPTE299M and the current dual link 292 standard SMPTE372M. The audio multiplexing system is explained below.

Two kinds of multiplexing systems for audio data in 1080 P are explained.

First Multiplexing System (1080 P)

When a first multiplexing system is used, an audio data packet is multiplexed with the next lines (excluding a switching line) of lines in which samples of audio are present. Since the number of samples per one line in 1080 P is smaller than 1, 48 kHz audio up to 16 channels can be multiplexed (96 kHz audio up to 8 channels) by a 124-byte audio data packet. 48 kHz audio up to 32 channels (96 kHz audio up to 16 channels) equivalent to the dual line 292 (SMPTE372M) can be transmitted by two 124-byte audio data packets.

FIG. 11 is a diagram of a configuration example of an audio data packet in transmitting data using 1080 P.

At frame rates 50 P, 59.94 P, and 60 P, the numbers of 48 kHz audio samples per one line are 0.8533 . . . , 0.7104 . . . , and 0.7111 . . . , respectively. Therefore, 48 kHz audio of 16 channels (in the case of 96 kHz audio, 8 channels at the maximum) is transmitted by a first audio data packet having data length of 124 bytes following EAV/LN/CRC of lines of a data stream 2.

48 kHz audio of 16 channels (in the case of 96 kHz audio, 8 channels at the maximum) is transmitted by using a second audio data packet having data length of 124 bytes. An audio clock phase is specified by a video clock (74.25 MHz (including 74.25/1.001 MHz) or 148.5 MHz (including 148.5/1.001 MHz)).

Second Multiplexing System (1080 P)

When a second multiplexing system is used, the dual link 292 (SMPTE372M) can be changed to the 3G-SDI Level A and the 3G-SDI Level A can be changed to the dual link 292 by minimum signal processing. In other words, simply by replacing SAV/EAV/LN/CRCC, audio data only has to be directly multiplexed with the data stream 2 of the 3G-SDI Level A or C ch of the Links A and B of the dual link 292 following CRCC.

Figure 12:
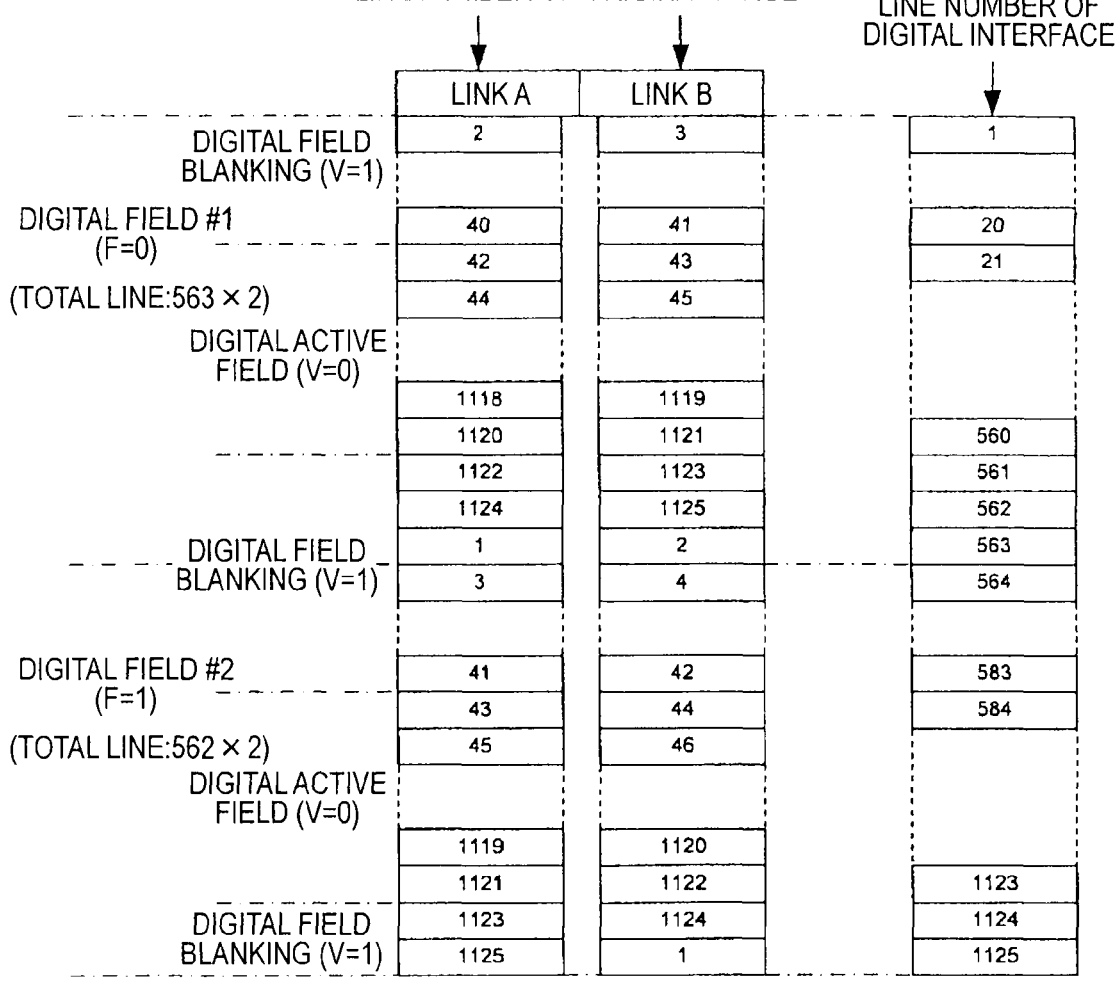
FIG. 12 is a diagram for explaining an example of line numbers and packages of a dual link interface according to the first embodiment.

FIG. 12 is a diagram of an example of allocation of digital fields shown in FIG. 2 of SMPTE372M.

A line number of an original video is shown for each of the Links A and B. A correspondence relation of a line number of a digital interface set for each of 2nth and 2n+1th (n is a natural number) line numbers is shown.

The digital fields include digital field blanking and a digital active field. Lines of the original video are multiplexed with the Link A in order of line numbers 2, 4, 1122, 1124, 1, 3, . . . , 1123, and 1125. Lines of the original video are multiplexed with the Link B in order of line numbers 3, 5, . . . , 1123, 1125, 2, 4, . . . , 1122, 1124, and 1.

Line numbers of the digital interface are reassigned as 1, 2, . . . , 1124, and 1125.

When compatibility with the SMPTE372M (dual link 292) standard is taken into account, first 2, 4, 6, . . . , and 1124 lines from the top of a reference first frame are transmitted. Subsequently, as in the current HD-SDI of 1.5 Gbps, 48 kHz audio up to first 16 channels (in the case of 96 kHz audio, 8 channels at the maximum) is transmitted by using first and second audio data packets having data length of 124 bytes following EAV/LN/CRC of a data stream 2 (equivalent to a C channel) of 1, 3, 5, . . . , and 1125 lines from the top of a second frame following the first frame.

When there are 16 channels or more of 48 kHz audio (in the case of 96 kHz audio, 8 channels), 3, 5, 7, . . . , and 1125 lines from the top of a reference first frame are transmitted. Subsequently, as in the current HD-SDI of 1.5 Gbps, 48 kHz audio up to first 16 channels (in the case of 96 kHz audio, 8 channels at the maximum) is transmitted by using first and second audio data packets having data length of 124 bytes following EAV/LN/CRC of a data stream 2 (equivalent to a C channel) of 2, 4, 6, . . . , and 1124 lines from the top of a second frame following the first frame.

An audio clock phase is specified by a video clock (74.25 MHz (including 74.25/1.001 MHz) or 148.5 MHz (including 148.5/1.001 MHz)). For example, a sample of audio 20th ch is present on an eight line and audio data is multiplexed on a ninth line, an audio clock phase is 13 bits and clocks up to 8192 clocks can be covered. Therefore, the audio data may be multiplexed on the next line. However, audio data to be multiplexed are multiplexed in order from one with a smallest sample number.

When this data structure is adopted, signal processing is performed in 2 frame units of 50 P, 60/1.001 P, and 60 P signals. A reference frame and the next frame can be identified by using F bits, which are usually used for identifying a first field and a second field of an XYZ signal specified by SMPTE274M, a reserved area of lower-order 2 bits of XYZ, or the like (see FIGS. 5A and 5B and FIGS. 6A to 6C).

Figure 13A:
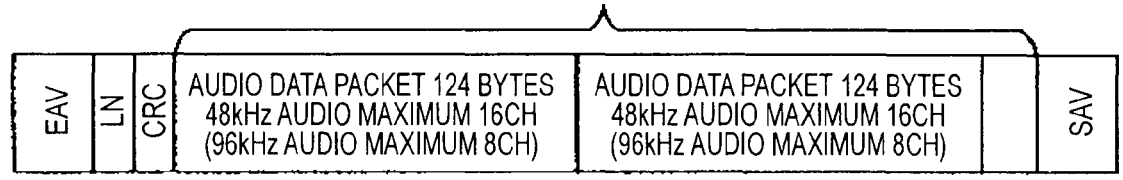
FIGS. 13A and 13B are diagrams for explaining configuration examples of audio data packets according to the first embodiment.
Figure 13B:
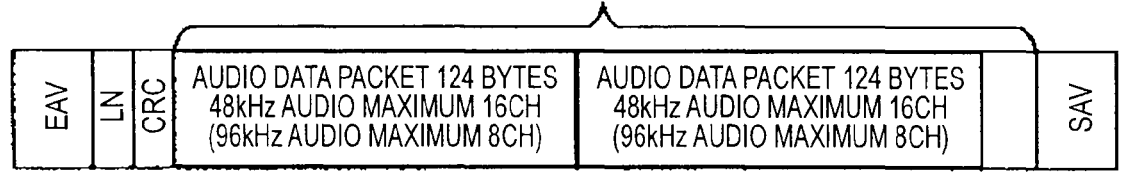

FIGS. 13A and 13B are diagrams of configuration examples of audio data packets in transmitting data using 1080 P. The configuration examples of the audio data packets shown in FIGS. 13A and 13B are the same as the configuration example of the audio data packet shown in FIG. 11.

The audio data packets shown in FIGS. 13A and 13B are audio data packets having length of 248 bytes obtained by connecting two 124-byte audio data packets. Maximum 16 channels of 48 kHz audio is stored in the 124-byte audio data packet. Maximum 8 channels of 96 kHz audio is stored in the 124-byte audio data packet.

FIG. 13A is a diagram of an example of a first audio data packet.

In the first audio data packet, 48 kHz audio up to 16 channels is stored in 2, 4, 6, . . . , and 1124 lines from the top of the reference frame and 1, 3, 5, . . . , and 1125 lines of the next frame.

FIG. 13B is a diagram of an example of a second audio data packet.

In the second audio data packet, 48 kHz audio up to 16 channels is stored in 3, 5, 7, . . . , and 1125 lines from the top of the reference frame, 2, 4, 6, . . . , and 1124 lines of the next frame, and one line of the next frame.

A multiplexing system for audio data in 1080I/4:4:4 is explained.

Third Multiplexing System (1080I/4:4:4)

When the third multiplexing method is used, the dual link 292 (SMPTE372M) can be changed to the 3G-SDI Level A and the 3G-SDI Level A can be changed to the dual link 292 by minimum signal processing. In other words, simply by replacing SAV/EAV/LN/CRCC, audio data only has to be directly multiplexed with the data stream 2 of the 3G-SDI Level A or C ch of the Links A and B of the dual link 292 following CRCC.

FIG. 14 is a diagram of an example of a third audio data packet.

The third audio data packet is an audio data packet having length of 496 bytes obtained by connecting four 124-byte audio data packets. Maximum 16 channels of 48 kHz audio is stored in the 124-byte audio data packet. Maximum 8 channels of 96 kHz audio is stored in the 124-byte audio data packet.

At frame rates 23.98 P, 24 P, 25 P, 29.97 P, and 30 P, the numbers of 48 kHz audio samples per one line are 1.779 . . . , 1.777, 1.7066 . . . , 1.4236, and 1.4222, respectively.

Therefore, 16 channels of 48 kHz audio data (in the case of 96 kHz audio, maximum 8 channels) is transmitted by two first and second 124-byte audio data packets following EAV/LN/CRC of lines of the data stream 2 in the same manner as the current HD-SDI of 1.5 Gbps. 16 channels of 48 kHz audio data (in the case of 96 kHz audio, maximum 8 channels) is further transmitted by the following two third and fourth 124-byte audio data packets. An audio clock phase is specified by a video clock (74.25 MHz (including 74.25/1.001 MHz) or 148.5 MHz (including 148.5/1.001 MHz)).

FIG. 15 is a diagram of an example of specification of a multiplexing position flag (mpf) of 48 kHz audio according to this embodiment.

In the case of audio data A, B, C, E, and G, an audio data packet is multiplexed in a horizontal auxiliary data space of the next horizontal line of a position of a second audio sample of a sample pair. When the audio data packet is multiplexed, mpf is 0.

An audio data packet including an audio sample is multiplexed and inserted in an auxiliary data space of a second horizontal line continuous from a first horizontal line. When a horizontal auxiliary data space follows a switching point, in order to prevent an error of data, the audio data packet is multiplexed with a delay of the next one line.

N/A (Not Available) indicates that an audio data packet may not be able to be multiplexed in a horizontal auxiliary data space of the next line of a switching point. For example, at a sampling point of audio data D, a switching point is present in an input video signal. Therefore, an audio data packet is multiplexed in a horizontal auxiliary data space of a second line with respect to input timing of an audio sample. Therefore, mpf is set to 1. Consequently, even when audio data is shifted one line by the switching point indicated by the audio data D in FIG. 15, the audio data can be multiplexed.

FIG. 16 is a diagram of an example of specification of a multiplexing position flag (mpf) of 96 kHz audio according to this embodiment.

In the case of audio data A, B, C, E, F, and G, an audio data packet is multiplexed in a horizontal auxiliary data space of the next horizontal line of a position of a second audio sample of a sample pair. When the audio data packet is multiplexed, mpf is 0.

An audio data packet including first and second audio samples is multiplexed and inserted in an auxiliary data space of a second horizontal line continuous from a first horizontal line. When a horizontal auxiliary data space follows a switching point, in order to prevent an error of data, the audio data packet is multiplexed with a delay of the next one line. A first audio data packet including the first and second audio samples and a second audio data packet continuing from the first audio data packet are multiplexed and inserted in an auxiliary data space of a third horizontal line continuing from the second horizontal line.

As explained with reference to FIG. 15, in FIG. 16, N/A (Not Available) indicates that an audio data packet may not be able to be multiplexed in a horizontal auxiliary data space of the next line of a switching point. A switching point is present in an input video signal, which is a sampling point of audio data D. An audio data packet is multiplexed in a horizontal auxiliary data space of a second line with respect to input timing of an audio sample. Therefore, in the audio data D included in an output video signal, mpf is set to 1.

With the signal transmitting device 10 and the signal receiving device 30 according to the first embodiment explained above, in the case of present 48 kHz audio in the 3G-SDI Level A, the specification of maximum 16 channels (in the case of 96 kHz audio, maximum 8 channels) can be expanded to maximum 32 channels in the case of double 48 kHz audio (in the case of 96 kHz audio, maximum 16 channels). In SMPTE428-2, in the case of 96 kHz audio, it is specified that maximum 16 channels are necessary. Therefore, it is possible to meet demands for multi-channel audio in future.

In the dual link 292 and the 3G-SDI Level B, in the case of 48 kHz audio multiplexing of maximum 32 channels (in the case of 96 kHz audio, maximum 16 channels) is possible. Therefore, it is possible to provide compatibility in the number of audio multiplexing channels between the 3G-SDI Level A and the dual link 292 or the 3G-SDI Level B by using the multiplexing system according to this embodiment.

The number of audio multiplexes in the 3G-SDI Level A specified in the current SMPTE425M is maximum 16 channels in 48 kHz sampling audio (maximum 8 channels in 96 kHz sampling audio). However, an audio data multiplexing system that makes it possible to realize maximum 32 channels in double 48 kHz sampling audio (maximum 16 channels in 96 kHz sampling audio) is devised. This makes it possible to meet demands for multi-channel audio exceeding 16 channels in future. The 3G-SDI Level A has compatibility with the dual link 292 and the 3G-SDI Level B in the number of audio multiplexing channels.

A second embodiment of the present invention is explained with reference to FIGS. 17 and 18. However, in FIGS. 17 and 18, components corresponding to those shown in FIGS. 2 and 3 referred to in the first embodiment are denoted by the same reference numerals and signs and detailed explanation of the components is omitted.

Figure 17:
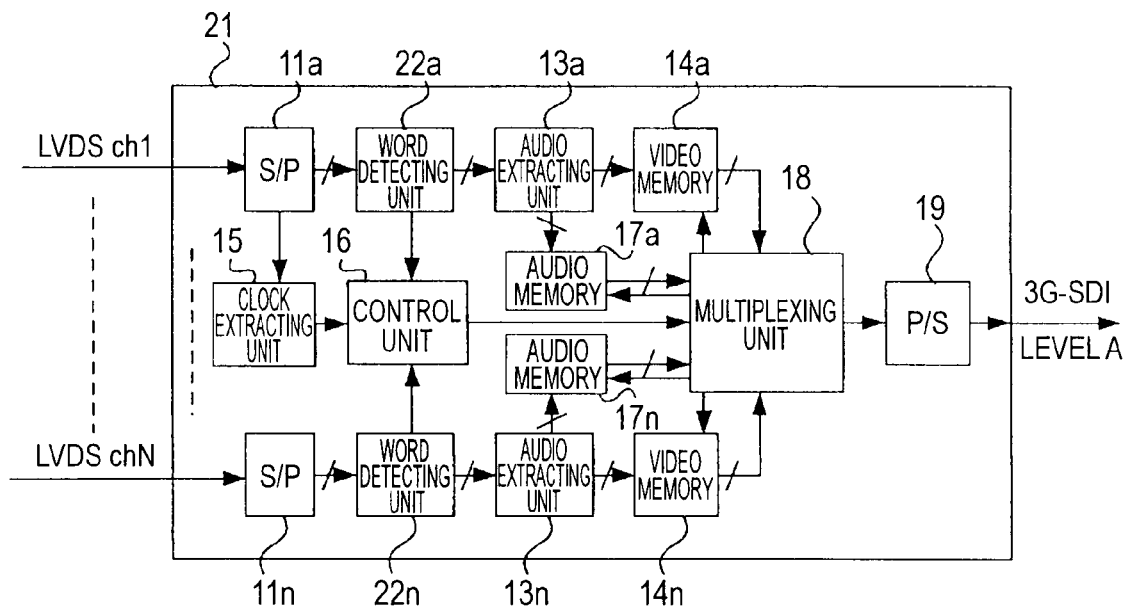
FIG. 17 is a block diagram of an internal configuration example of a signal transmitting device according to a second embodiment of the present invention.

FIG. 17 is a diagram of an internal configuration example of a signal transmitting device 21 according to the second embodiment. The signal transmitting device 21 is input with N channels (ch1 to chN) of LVDS signals in a differential transmission system multiplexed with audio data. The signal transmitting device 21 includes, according to the number of channels, n S/P converting units 11a to 11n, n word detecting units 22a to 22n that detect word synchronous signals from parallel data, n audio extracting units 13a to 13n, and n video memories 14a to 14n.

An operation example of the signal transmitting device 21 is explained.

When an input signal is a multi-channel LVDS, the S/P converting units 11a to 11n S/P-convert channels. The word detecting units 22a to 22n detect predetermined word synchronous signals in the channels and synchronize words. The audio-extracting units 13a to 13n extract audio data multiplexed in a predetermined place and send the audio data to the audio memories 17a to 17n. The audio extracting units 13a to 13n input video data after the extraction of the audio data to the video memories 14a to 14n. The following operation is the same as the operation of the signal transmitting device 10 according to the first embodiment.

Figure 18:
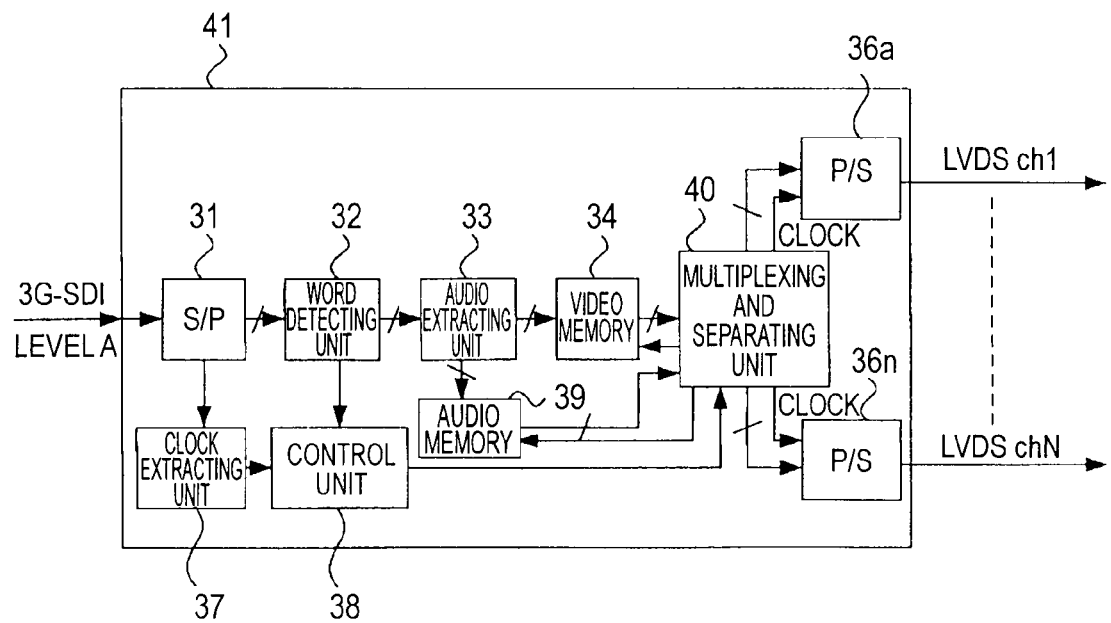
FIG. 18 is a block diagram of an internal configuration example of a signal receiving device according to the second embodiment.

FIG. 18 is a diagram of an internal configuration example of a signal receiving device 41 according to the second embodiment. The signal receiving device 41 includes a multiplexing and separating unit 40 that multiplexes audio data read out from the audio memory 39 with video data read out from the video memory 34 and separates the audio data into n channels. When an output signal is a multi-channel LVDS signal, the multiplexing and separating unit 40 separates and extracts ch1 to chN from the memory, multiplexes a TRS with the video data, and divides the video data into the ch1 to chN. The multiplexing and separating unit 40 multiplexes the audio data in a predetermined period of the video data. The P/S converting units 36a to 36n multiplex, on the basis of a reference clock supplied from the multiplexing and separating unit 40, a predetermined word synchronous signal with the Links, convert parallel data of the channels into serial signals of plural channels in the differential transmission system such as the LVDSs in the ch1 to chN, and send the serial signals to an external apparatus.

According to the second embodiment explained above, the signal transmitting device 21 included in a camera multiplexes audio data extracted from LVDS signals of plural channels with video data converted into the 3G-SDI Level A and sends the video data to the CCU 2. On the other hand, the signal receiving device 41 included in the CCU 2 multiplexes the audio data extracted from the received video data in the 3G-SDI Level A with video data of the serial signals of the plural channels in the differential transmission system such as LVDSs and sends the video data to the external apparatus. Therefore, there is an effect that it is possible to provide an interface for transmitting and receiving LVDS signal multiplexed with audio data by using the signal transmitting device 21 and the signal receiving device 41.

Figure 19:
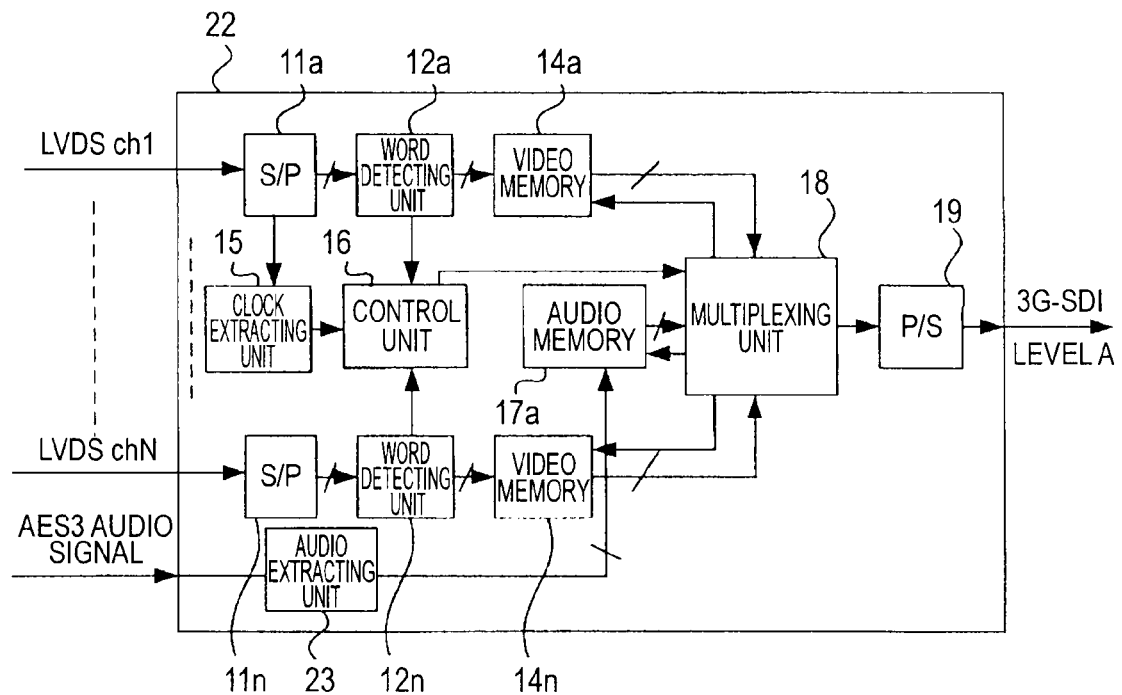
FIG. 19 is a block diagram of an internal configuration example of a signal transmitting device according to a third embodiment of the present invention.

FIG. 19 is a diagram of an internal configuration example of a signal transmitting device 22 according to a third embodiment of the present invention.

The signal transmitting device 22 is input with N channels (ch1 to chN) of serial signals of plural channels in the differential transmission system such as LVDSs in the differential transmission system multiplexed with audio data. The signal transmitting device 21 includes an audio extracting unit 23 that extracts input audio data and stores the audio data in an audio memory 17c. The signal transmitting device 22 includes, according to the number of channels, the n S/P converting units 11a to 11n, the n word detecting units 22a to 22n that detect word synchronous signals from parallel data, and the n video memories 14a to 14n.

An operation example of the signal transmitting device 22 is explained.

When an input signal is not multiplexed with audio data and input from the outside to the signal transmitting device 22 in a data format such as AES3, the audio extracting unit 23 extracts audio data from data such as AES3 and inputs the audio data to the audio memory 17a. When input signals are serial signals of plural channels in the differential transmission system such as multi-channel LVDSs, the S/P converting units 11a to 11n S/P-convert the channels. The word detecting units 22a to 22n detect predetermined word synchronous signal in the channels and synchronize words. The word detecting units 22a to 22n input video data to the video memories 14a to 14n. The following operation is the same as the operation of the signal transmitting device 10 according to the first embodiment.

Figure 20:
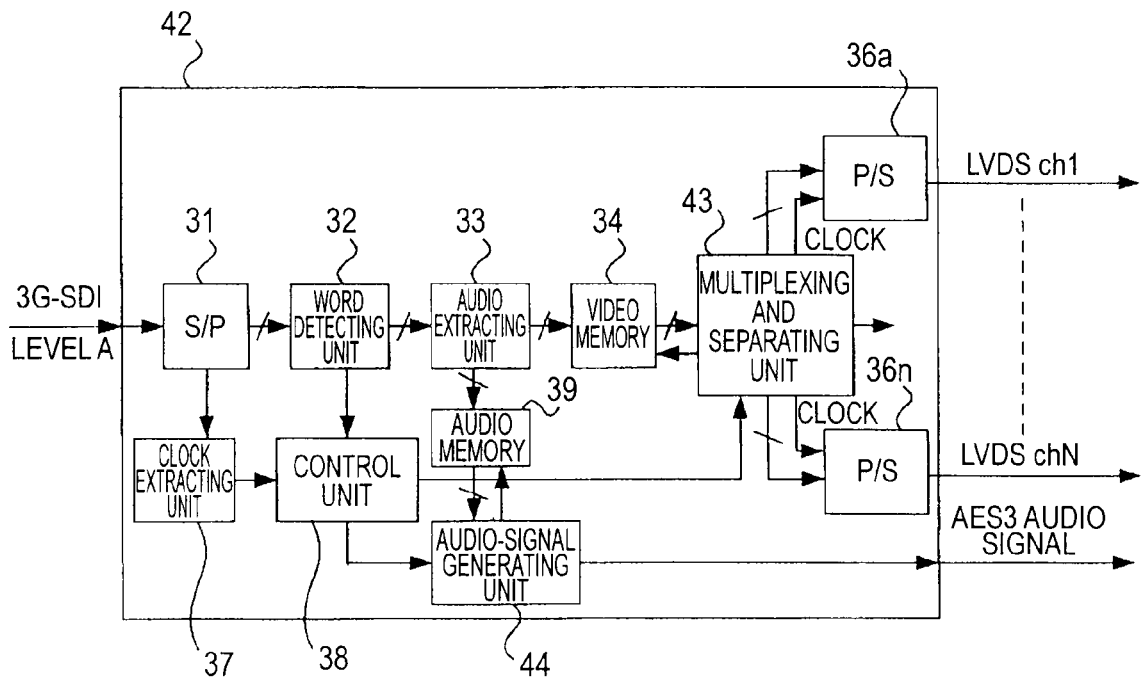
FIG. 20 is a block diagram of an internal configuration example of a signal receiving device according to the third embodiment.

FIG. 20 is a diagram of an internal configuration example of a signal receiving device 42 according to the third embodiment. The signal receiving device 42 includes an audio-signal generating unit 44 that reads out audio data from the audio memory 39 and generates an audio signal of an AES system according to the control by the control unit 38. The signal receiving device 42 further includes a multiplexing and separating unit 43 that multiplexes, when output signals are multi-channel LVDSs, the audio data read out from the audio data memory 39 with the video data readout from the video memory 34 and separates the video data into n channels. The multiplexing and separating unit 43 multiplexes a TRS with the video data read out from the video memory 43 and separates the video data into the ch1 to chN. The multiplexing and separating unit 43 multiplexes the audio data read out from the audio memory 39 in a predetermined period of the video data read out from the video memory 34.

The audio-signal generating unit 44 converts the audio data read out from the audio memory 39 into audio data such as ES3 and outputs the audio data. The control unit 38 supplies a clock for signal processing used by the audio-signal generating unit 44. When the audio data is not multiplexed with a dual link HD-SDI signal, a 2ch HD-SDI signal, multi-channel LVDS signals, and the like and is output in a data format such as AES3, the P/S converting units 36a to 36n multiplex, on the basis of a reference clock supplied from the multiplexing and separating unit 43, predetermined word synchronous signals with the channels, convert parallel data of the channels into LVDSs of the ch1 to chN, and send the parallel data to an external apparatus.

According to the third embodiment, the signal transmitting device 22 included in a camera multiplexes audio data extracted from serial signals of plural channels in the differential transmission system such as LVDSs with video data converted into the 3G-SDI Level A and sends the video data to the CCU 2. On the other hand, the signal receiving device 42 included in the CCU 2 multiplexes the audio data extracted from the received video data in the 3G-SDI Level A with video data of LVDSs of plural channels and sends the video data to the external apparatus. An audio signal is not multiplexed with the serial signals of the plural channels in the differential transmission system such as LVDSs input to the signal transmitting device 22 and LVDSs output from the signal receiving device 42. Even in this case, there is an effect that it is possible to provide an interface for transmitting and receiving the serial signals of the plural channels in the differential transmission system such as LVDSs and the audio signal by using the signal transmitting device 22 and the signal receiving device 42.

The present application contains subject matter related to that disclosed in Japanese Priority Patent Application JP 2008-148567 filed in Japan Patent Office on Jun. 5, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmitting device comprising:
a synchronous-data detecting unit that detects, from parallel data specified by a predetermined format and including video data and audio data, synchronous data for controlling synchronization of the parallel data, the parallel data to be input is parallel signals of a dual link or a high definition serial digital interface (HD-SDI) format allocated to first and second links;

an audio extracting unit that stores the audio data in an audio memory;

a clock extracting unit that extracts a reference clock from the parallel data;

a multiplexing unit that multiplexes the audio data read out from the audio memory and the synchronous data in a horizontal auxiliary data space of the video data associated with the first and second links, the horizontal auxiliary data space of the video data being at least twice as large as a horizontal auxiliary space included in the HD-SDI format;

a control unit that controls, on the basis of the synchronous data detected by the synchronous-data detecting unit and the reference clock extracted by the clock extracting unit, timing of the multiplexing unit for multiplexing the audio data with the video data; and a parallel serial converting unit that converts the video data multiplexed with the audio data by the multiplexing unit into a transmission stream specified by a Level A of a 3G serial digital interface (3G-SDI) format.

2. The signal transmitting device according to claim 1, wherein the video data is any one of a 10-bit quantized signal of 4:4:4(R'G'B')/(Y'C'bC'r), a 10-bit quantized signal of 4:4:4:4(R'G'B'+A)/(Y'C'bC'r+A), and a 12-bit quantized signal of 4:4:4(R'G'B')/(Y'C'bC'r)/X'Y'Z', and frame rates of the video data are one of 24 P, 24/1.001 P, 25 P, 30 P, and 30/1.001 P or the video data is a 12-bit quantized signal of 4:2:2/(Y'C'bC'r) and frame rates of the video data are one of 24 P, 24/1.001 P, 25 P, 30 P, and 30/1.001 P, and when the video data is a 10-bit quantized signal of 4:2:2/(Y'C'bC'r) or when frame rates of the video data are one of 50 P, 60 P, and 60/1.001 P, a number of lines per unit time is at least twice as large as a number of lines per unit time of the HD-SDI format.

3. A signal transmitting method comprising the steps of:

detecting, from parallel data specified by a predetermined format and including video data and audio data, synchronous data for controlling synchronization of the parallel data, the parallel data to be input is parallel signals of a dual link or a high definition serial digital interface (HD-SDI) format allocated to first and second links;

storing the audio data in an audio memory;

extracting a reference clock from the parallel data;

controlling, on the basis of the synchronous data and the reference clock, timing for multiplexing the audio data with the video data and multiplexing the audio data read out from the audio memory and the synchronous data in a horizontal auxiliary data space of the video data associated with first and second links, the horizontal auxiliary data space of the video data being at least twice as large as a horizontal auxiliary space included in the HD-SDI format; and converting the video data multiplexed with the audio data into a transmission stream specified by a Level A of a 3G serial digital interface (3G-SDI) format.

4. A signal receiving device comprising:

a serial parallel converting unit that converts a transmission stream specified by a Level A of a 3G serial digital interface (3G-SDI) format and including video data and audio data included in a horizontal auxiliary data space of the video data into parallel data, the horizontal auxiliary data space of the video data being at least twice as large as a horizontal auxiliary space included in a high definition serial digital interface (HD-SDI) format;

a synchronous-data detecting unit that detects synchronous data for controlling synchronization of the parallel data included in the parallel data;

an audio extracting unit that stores the audio data extracted from the parallel data in an audio memory;

a clock extracting unit that extracts a reference clock from the parallel data converted by the serial parallel converting unit;

a multiplexing unit that multiplexes the audio data read out from the audio memory with the video data, the data output from the multiplexing unit is parallel signals of a dual link or the HD-SDI format allocated to first and second links; and a control unit that controls, on the basis of the synchronous data detected by the synchronous-data detecting unit and the reference clock extracted by the clock extracting unit, timing of the multiplexing unit for multiplexing the audio data with the video data.

5. The signal receiving device according to claim 4, wherein the video data is any one of a 10-bit quantized signal of 4:4:4(R'G'B')/(Y'C'bC'r), a 10-bit quantized signal of 4:4:4:4(R'G'B'+A)/(Y'C'bC'r+A), and a 12-bit quantized signal of 4:4:4(R'G'B')/(Y'C'bC'r)/X'Y'Z' and frame rates of the video data are one of 24 P, 24/1.001 P, 25 P, 30 P, and 30/1.001 P or the video data is a 12-bit quantized signal of 4:2:2/(Y'C'bC'r) and frame rates of video data are one of 24 P, 24/1.001 P, 25 P, 30 P, and 30/1.001 P, and when the video data is a 10-bit quantized signal of 4:2:2/(Y'C'bC'r) or when frame rates of the video are one of 50P, 60P, and 60/1.001 P, a number of lines per unit time is at least twice as large as a number of lines per unit time of the HD-SDI format.

6. A signal receiving method comprising the steps of:

converting a transmission stream specified by a Level A of a 3G serial digital interface (3G-SDI) format and including video data and audio data included in a horizontal auxiliary data space of the video data into parallel data, the horizontal auxiliary data space of the video data being at least twice as large as a horizontal auxiliary space included in a high definition serial digital interface (HD-SDI) format;

detecting synchronous data for controlling synchronization of the parallel data included in the parallel data;

storing the audio data extracted from the parallel data in an audio memory;

extracting a reference clock from the parallel data; and controlling timing for multiplexing the audio data with the video data on the basis of the synchronous data and the reference clock to multiplex the audio data read out from the audio memory with the video data, the data output from the multiplexing is parallel signals of a dual link or the HD-SDI format allocated to first and second links.

7. A signal transmitting device comprising:

a synchronous-data detecting unit that detects, from parallel data specified by a predetermined format and including video data and audio data, synchronous data for controlling synchronization of the parallel data;

an audio extracting unit that stores the audio data in an audio memory;

a clock extracting unit that extracts a reference clock from the parallel data;

a multiplexing unit that multiplexes the audio data read out from the audio memory and the synchronous data in a horizontal auxiliary data space of the video data;

a control unit that controls, on the basis of the synchronous data detected by the synchronous-data detecting unit and the reference clock extracted by the clock extracting unit, timing of the multiplexing unit for multiplexing the audio data with the video data; and a parallel serial converting unit that converts the video data multiplexed with the audio data by the multiplexing unit into a transmission stream specified by a Level A of a 3G serial digital interface (3G-SDI) format, wherein when the video data is any one of a 10-bit quantized signal of 4:4:4(R'G'B')/(Y'C'bC'r), a 10-bit quantized signal of 4:4:4:4(R'G'B'+A)/(Y'C'bC'r+A), and a 12-bit quantized signal of 4:4:4(R'G'B')/(Y'C'bC'r)/X'Y'Z' and frame rates of the video data are one of 24 P, 24/1.001 P, 25 P, 30 P, and 30/1.001 P or when the video data is a 12-bit quantized signal of 4:2:2/(Y'C'bC'r) and frame rates of video data are one of 24 P, 24/1.001 P, 25 P, 30 P, and 30/1.001 P, the horizontal auxiliary data space in any one of the quantized signals has a length at least twice as large as that of a horizontal auxiliary data space included in a high definition serial digital interface (HD-SDI) format, when the video data is a 10-bit quantized signal of 4:2:2/(Y'C'bC'r) or when frame rates of the video are one of 50P, 60P, and 60/1.001 P, a number of lines per unit time is at least twice as large as a number of lines per unit time of the HD-SDI format, and the parallel data to be input is serial signals of plural channels in a differential transmission system multiplexed with the audio data.

8. A signal transmitting device comprising:

a synchronous-data detecting unit that detects, from parallel data specified by a predetermined format and including video data and audio data, synchronous data for controlling synchronization of the parallel data;

an audio extracting unit that stores the audio data in an audio memory;

a clock extracting unit that extracts a reference clock from the parallel data;

a multiplexing unit that multiplexes the audio data read out from the audio memory and the synchronous data in a horizontal auxiliary data space of the video data;

a control unit that controls, on the basis of the synchronous data detected by the synchronous-data detecting unit and the reference clock extracted by the clock extracting unit, timing of the multiplexing unit for multiplexing the audio data with the video data; and a parallel serial converting unit that converts the video data multiplexed with the audio data by the multiplexing unit into a transmission stream specified by a Level A of a 3G serial digital interface (3G-SDI) format, wherein when the video data is any one of a 10-bit quantized signal of 4:4:4(R'G'B')/(Y'C'bC'r), a 10-bit quantized signal of 4:4:4:4(R'G'B'+A)/(Y'C'bC'r+A), and a 12-bit quantized signal of 4:4:4(R'G'B')/(Y'C'bC'r)/X'Y'Z' and frame rates of the video data are one of 24 P, 24/1.001 P, 25 P, 30 P, and 30/1.001 P or when the video data is a 12-bit quantized signal of 4:2:2/(Y'C'bC'r) and frame rates of video data are one of 24 P, 24/1.001 P, 25 P, 30 P, and 30/1.001 P, the horizontal auxiliary data space in any one of the quantized signals has a length at least twice as large as that of a horizontal auxiliary data space included in a high definition serial digital interface (HD-SDI) format, when the video data is a 10-bit quantized signal of 4:2:2/(Y'C'bC'r) or when frame rates of the video data are one of 50P, 60P, and 60/1.001 P, a number of lines per unit time is at least twice as large as a number of lines per unit time of the HD-SDI format, the parallel data to be input is serial signals of plural channels in a differential transmission system, the video data not multiplexed with the audio data within the parallel data, and the audio extracting unit extracts the audio data from an input audio signal of a predetermined format.

9. A signal receiving device comprising:

a serial parallel converting unit that converts a transmission stream specified by a Level A of a 3G serial digital interface (3G-SDI) format and including video data and audio data included in a horizontal auxiliary data space of the video data into parallel data;

a synchronous-data detecting unit that detects synchronous data for controlling synchronization of the parallel data included in the parallel data;

an audio extracting unit that stores the audio data extracted from the parallel data in an audio memory;

a clock extracting unit that extracts a reference clock from the parallel data converted by the serial parallel converting unit;

a multiplexing unit that multiplexes the audio data read out from the audio memory with the video data; and a control unit that controls, on the basis of the synchronous data detected by the synchronous-data detecting unit and the reference clock extracted by the clock extracting unit, timing of the multiplexing unit for multiplexing the audio data with the video data, wherein when the video data is any one of a 10-bit quantized signal of 4:4:4(R'G'B')/(Y'C'bC'r), a 10-bit quantized signal of 4:4:4:4(R'G'B'+A)/(Y'C'bC'r+A), and a 12-bit quantized signal of 4:4:4(R'G'B')/(Y'C'bC'r)/X'Y'Z' and frame rates of the video data are one of 24 P, 24/1.001 P, 25 P, 30 P, and 30/1.001 P or the video data is a 12-bit quantized signal of 4:2:2/(Y'C'bC'r) and frame rates of video data are one of 24 P, 24/1.001 P, 25 P, 30 P, and 30/1.001 P, the horizontal auxiliary data space in any one of the quantized signals has a length at least twice as large as that of a horizontal auxiliary data space included in a high definition serial digital interface (HD-SDI) format, when the video data is a 10-bit quantized signal of 4:2:2/(Y'C'bC'r) or when frame rates of the video data are one of 50P, 60P, and 60/1.001 P, a number of lines per unit time is at least twice as large as a number of lines per unit time of the HD-SDI format, and wherein data output from the multiplexing unit is serial signals of plural channels in a differential transmission system multiplexed with the audio data.

10. A signal receiving device comprising:

a serial parallel converting unit that converts a transmission stream specified by a Level A of a 3G serial digital interface (3G-SDI) format and including video data and audio data included in a horizontal auxiliary data space of the video data into parallel data;

a synchronous-data detecting unit that detects synchronous data for controlling synchronization of the parallel data included in the parallel data;

an audio extracting unit that stores the audio data extracted from the parallel data in an audio memory;

a clock extracting unit that extracts a reference clock from the parallel data converted by the serial parallel converting unit;

a multiplexing unit that multiplexes the audio data read out from the audio memory with the video data; and a control unit that controls, on the basis of the synchronous data detected by the synchronous-data detecting unit and the reference clock extracted by the clock extracting unit, timing of the multiplexing unit for multiplexing the audio data with the video data, wherein when the video data is any one of a 10-bit quantized signal of 4:4:4(R'G'B')/(Y'C'bC'r), a 10-bit quantized signal of 4:4:4(R'G'B'+A)/(Y'C'bC'r+A), and a 12-bit quantized signal of 4:4:4(R'G'B')/(Y'C'bC'r)/X'Y'Z' and frame rates of the video data are one of 24 P, 24/1.001 P, 25 P, 30 P, and 30/1.001 P or when the video data is a 12-bit quantized signal of 4:2:2/(Y'C'bC'r) and frame rates of video data are one of 24 P, 24/1.001 P, 25 P, 30 P, and 30/1.001 P, the horizontal auxiliary data space in any one of the quantized signals has a length at least twice as large as that of a horizontal auxiliary data space included in a high definition serial digital interface (HD-SDI) format, when the video data is a 10-bit quantized signal of 4:2:2/(Y'C'bC'r) or when frame rates of the video data are one of 50P, 60P , and 60/1.001 P, a number of lines per unit time is at least twice as large as a number of lines per unit time of the HD-SDI format, data output from the signal receiving device is serial signals of plural channels in a differential transmission system not multiplexed with the audio data, and the signal receiving device includes an audio-signal generating unit that generates an audio signal of a predetermined format from the audio data read out from the audio memory.

* * * * *